(12) United States Patent
Mogill

(10) Patent No.: US 12,738,038 B1
(45) Date of Patent: Sep. 15, 2026

(54) SYSTEM AND METHOD FOR DYNAMIC RECALIBRATION OF VIDEO STREAMS

(71) Applicant: Crisp, Inc., Atlanta, GA (US)

(72) Inventor: Michael Mogill, Atlanta, GA (US)

(73) Assignee: Crisp, Inc., Atlanta, GA (US)

( * ) Notice: Subject to any disclaimer, the term of this patent is extended or adjusted under 35 U.S.C. 154(b) by 0 days.

(21) Appl. No.: 19/349,317

(22) Filed: Oct. 3, 2025

(51) Int. Cl.
*G06V 10/776* (2022.01)
*G06N 20/00* (2019.01)

(52) U.S. Cl.
CPC ........... *G06V 10/776* (2022.01); *G06N 20/00* (2019.01)

(58) Field of Classification Search
CPC ............................ G06V 10/776; G06N 20/00
See application file for complete search history.

(56) References Cited

U.S. PATENT DOCUMENTS

| | | | | |
|---|---|---|---|---|
| 11,457,271 | B1 * | 9/2022 | Faulkner | H04N 7/152 |
| 2019/0057197 | A1 | 2/2019 | Wang et al. | |
| 2020/0160373 | A1 | 5/2020 | Thimmaiah et al. | |
| 2021/0297739 | A1 | 9/2021 | Manus et al. | |
| 2025/0103605 | A1 * | 3/2025 | Gianelle | G06F 18/2321 |
| 2025/0168217 | A1 * | 5/2025 | Sundareson | H04L 65/611 |

FOREIGN PATENT DOCUMENTS

| | | | | |
|---|---|---|---|---|
| CN | 106331480 B | * | 1/2020 | H04N 23/681 |
| DE | 202025102096 U1 | | 4/2025 | |

OTHER PUBLICATIONS

“Koffka Khan, Tokenization of Video Content on Blochchain: Navigating the Future of Adaptive Video Streaming, 2024, International Journal of Multidisciplinary Research and Publications, vol. 6, Issue 7, pp. 181-189” (Year: 2024).*

“Alan F. Smeaton, Techniques Used and Open Challenged to the Analysis, Indexing and Retrieval of Digital Video, Jun. 2007, Information Systems, vol. 32, Issue 4, pp. 545-559” (Year: 2007).*

“P. Le Callet et. al., A Convolutional Neural Network Approach for Objective Video Quality Assessment, Sep. 2006, IEEE Transactions on Neural Networks, vol. 17, Issue 5” (Year: 2006).*

“Nabajeet Barman et. al., No-Reference Video Quality Estimation Based on Machine Learning for Passive Gaming Video Streaming Applications, Jun. 2019, IEEE Access, vol. 7” (Year: 2019).*

* cited by examiner

*Primary Examiner* — Chineyere Wills-Burns
*Assistant Examiner* — Phuong Hau Cai
(74) *Attorney, Agent, or Firm* — CALDWELL LLC

(57) ABSTRACT

A system for dynamic recalibration of video streams, the system including a processor and a memory communicatively connected to the processor, the memory containing instructions configuring the processor to receive metadata associated with a plurality of video streams situated on one or more streaming platforms, wherein each video stream of the plurality of video streams includes a weighting associated with an allocation of a fixed resource, monitor a performance of the plurality of video streams by identifying at least an interaction metric as a function of the metadata, identify one or more videos streams including an anomaly by comparing the performance of each of the plurality of video streams to one or more streaming thresholds and reallocate the fixed resource by adjusting the weighting of one or more video streams of the plurality of video streams as a function of the anomaly.

18 Claims, 8 Drawing Sheets

SYSTEM AND METHOD FOR DYNAMIC RECALIBRATION OF VIDEO STREAMS

FIELD OF THE INVENTION

The present invention generally relates to the field of video streaming. In particular, the present invention is directed to systems and methods for dynamic recalibration of video streams.

BACKGROUND

Existing systems for managing video streams generally depend on static rules or batch reporting, which makes them slow and rigid. Systems that provide resource allocation capabilities often lag, and as a result, underperforming streams continue to receive resources long after problems appear. Existing systems lack the capabilities for dynamic recalibration of video streams, leaving them inefficient, delayed, and unable to respond effectively to shifting conditions.

SUMMARY OF THE DISCLOSURE

In an aspect a system for dynamic recalibration of video streams is described. The system includes a processor and a memory communicatively connected to the processor. The memory contains instructions configuring the processor to receive metadata associated with a plurality of video streams situated on one or more streaming platforms, wherein each video stream of the plurality of video streams includes a weighting associated with an allocation of a fixed resource, monitor a performance of the plurality of video streams by identifying at least an interaction metric as a function of the metadata, identify one or more videos streams including an anomaly by comparing the performance of each of the plurality of video streams to one or more streaming thresholds and reallocate the fixed resource by adjusting the weighting of one or more video streams of the plurality of video streams as a function of the anomaly.

In another aspect, a method for dynamic recalibration of video streams is described. The method includes receiving, by at least a processor, metadata associated with a plurality of video streams situated on one or more streaming platforms, wherein each video stream of the plurality of video streams includes a weighting associated with an allocation of a fixed resource, monitoring, by the at least a processor, a performance of the plurality of video streams by identifying at least an interaction metric as a function of the metadata, identifying, by the at least a processor, one or more videos streams including an anomaly by comparing the performance of each of the plurality of video streams to one or more streaming thresholds and reallocating, by the at least a processor, the fixed resource by adjusting the weighting of one or more video streams of the plurality of video streams as a function of the anomaly.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to systems and methods for dynamic recalibration of allocations across multiple video streams on one or more streaming platforms based on observed performance. In an embodiment, a processor receives metadata associated with a plurality of video streams, each stream having a weighting that defines its share of a fixed resource (e.g., budget, impressions, bandwidth). The processor monitors performance by identifying at least one interaction metric from the metadata, compares the resulting performance to one or more streaming thresholds to determine whether an anomaly exists, and reallocates the fixed resource by adjusting the weighting of one or more video streams as a function of the detected anomaly.

Aspects of the present disclosure can be used to optimize distribution of fixed resources among concurrent video streams so that allocation more closely tracks measured performance. Aspects of the present disclosure can also be used to mitigate prolonged underperformance by promptly identifying streams that deviate from expected ranges and shifting allocation toward comparatively better-performing streams. This is so, at least in part, because the system ingests stream metadata, derives interaction metrics indicative of performance, evaluates such metrics against configurable thresholds, identifies anomalies at the stream level, and updates weightings for the plurality of streams while preserving the fixed total of the resource.

Aspects of the present disclosure allow for a closed-loop adjustment process that operates across heterogeneous streaming platforms and resource types while remaining deterministic and auditable through explicit thresholds and weightings. Benefits include improved efficiency in resource utilization, reduced waste on underperforming streams, and more stable attainment of campaign objectives by aligning allocation with observed interaction metrics. Exemplary embodiments illustrating aspects of the present disclosure are described below in the context of several specific examples.

Figure 1:
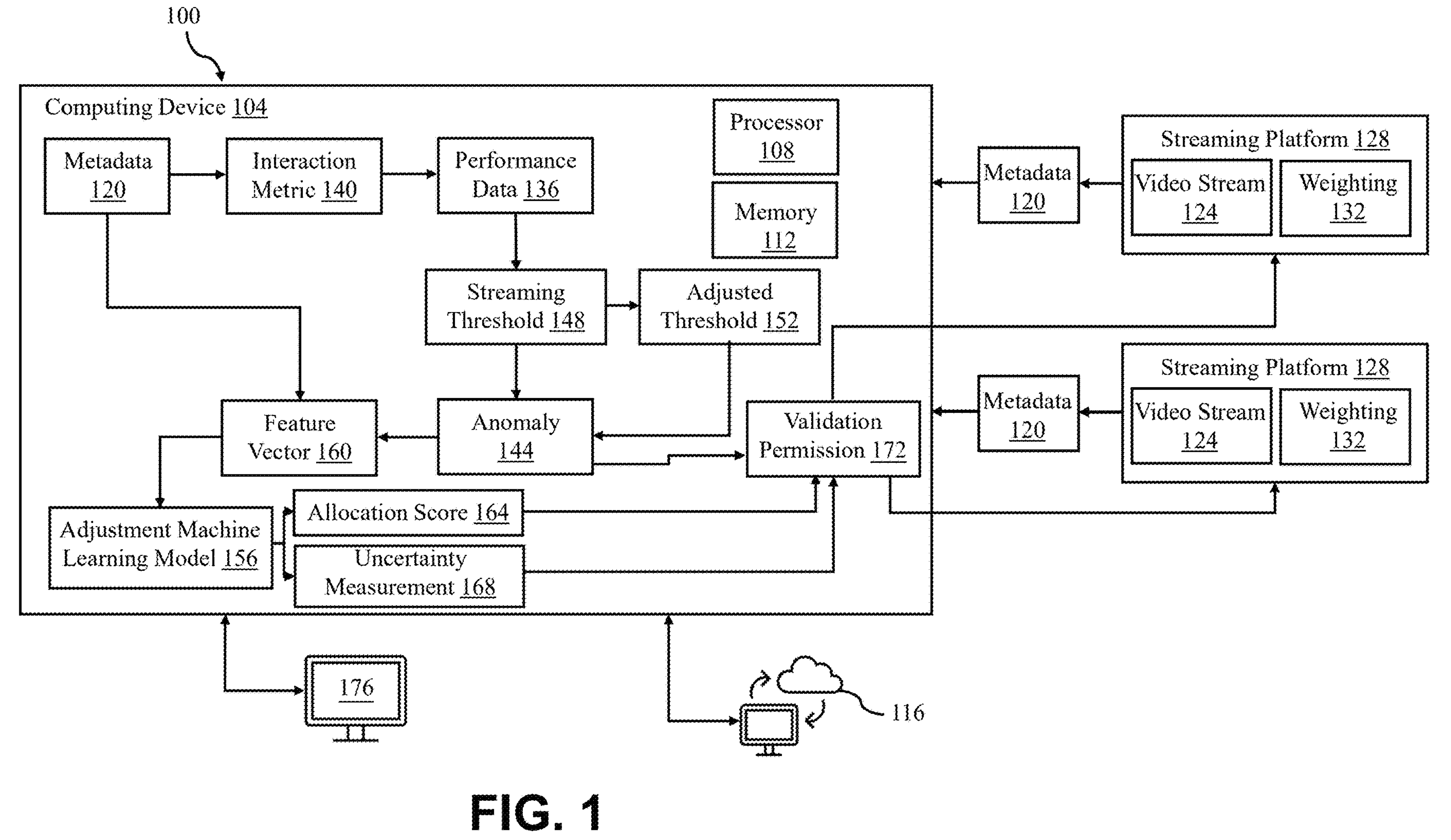
FIG. 1 is a block diagram illustrating an exemplary embodiment of a system for dynamic recalibration of video streams.

Referring now to FIG. 1, a system 100 for dynamic recalibration of video streams is described. In one or more embodiments, system 100 includes a computing device 104. System 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device 104. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiments, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register may be configured to synchronize the processor with other computing components. In one or more embodiments, processor 108 may include more than one processing unit having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU may be configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently or may include two or more computing devices operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, system 100 may include a database 116. Database may include a remote database. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. In one or more embodiments, database may include a remote database. A "remote database" as described in this disclosure is a is a database that is hosted on a server or computing system that is not located on the same physical machine as the client accessing it. Instead, it is accessed over a network, such as a local area network (LAN), a wide area network (WAN), or the internet. In one or more embodiments, computing device 104 may be communicatively connected to remote database, wherein computing device 104 may receive and/or transmit any data as described in this disclosure. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device. In one or more embodiments, computing device 104 may transmit processes to server wherein computing device 104 may conserve power or energy.

With continued reference to FIG. 1, system 100 may be communicatively connected to a camera. As used in this disclosure, a "camera" is a device that is configured to sense electromagnetic radiation, such as without limitation visible light, and generate an image representing the electromagnetic radiation. In one or more embodiments, a camera may include one or more optics. Exemplary non-limiting optics include spherical lenses, aspherical lenses, reflectors, polarizers, filters, windows, aperture stops, and the like. In one or more embodiments, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In one or more embodiments, a camera may be sensitive within a non-visible range of electromagnetic radiation, such as without limitation infrared. As used in this disclosure, "image data" is information representing at least a physical scene, space, and/or object. In one or more embodiments, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image. In one or more embodiments, camera may be configured to capture one or more images. In one or more embodiments, camera may be configured to capture one or more images and/or videos of a scene, surrounding environment and/or the like. This will be described in further detail below.

With continued reference to FIG. 1, system 100 may include and/or be communicatively connected to a machine vision system. In one or more embodiments, system 100 may include a machine vision system that includes at least a camera. In one or more embodiments, machine vision system may include and/or be included in computing device 104. In one or more embodiments, steps and/or processes of machine vision system may be performed on computing device 104. A machine vision system may use images from at least a camera, to make a determination about a scene, space, and/or object. For example, in one or more embodiments a machine vision system may be used for world modeling or registration of objects within a space. In one or more embodiments, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In one or more embodiments, registration may include one or more transformations to orient a camera frame (or an image or video stream) relative a three-dimensional coordinate system; exemplary transformations include without limitation homography transforms and affine transforms. In one or more embodiments, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In one or more embodiments, x and y axes may be chosen to span a plane common to two cameras used for stereoscopic image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In one or more embodiments, a machine vision system may use a classifier, such as any classifier described throughout this disclosure.

With continued reference to FIG. 1, in one or more embodiments, camera may include a range-imaging camera. An exemplary range-imaging camera that may be included in machine vision system is Intel® RealSense™ D430 Module, from Intel® of Mountainview, California, U.S.A. D430 Module comprises active infrared (IR) illumination and a stereoscopic camera, having global shutters and frame rate of up to 90 fps. D430 Module provide a field of view (FOV) of 85.20 (horizontal) by 580 (vertical) and an image resolution of 1280×720. Range-sensing camera may be operated independently by dedicated hardware, or, in one or more embodiments, range-sensing camera may be operated by a computing device 104. In one or more embodiments, range-sensing camera may include software and firmware resources (for execution on hardware, such as without limitation dedicated hardware or a computing device 104). D430 Module may be operating using software resources including Intel® RealSense™ SDK 2.0, which include opensource cross platform libraries.

With continued reference to FIG. 1, in one or more embodiments, camera may include a machine vision camera. An exemplary machine vision camera that may be included in machine vision system is an OpenMV Cam H7 from OpenMV, LLC of Atlanta, Georgia, U.S.A. OpenMV Cam comprises a small, low power, microcontroller which allows execution of machine vision applications. OpenMV Cam comprises an ARM Cortex M7 processor 108 and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording.

With continued reference to FIG. 1, camera may include a stereo camera. As used in this disclosure, a "stereo-camera" is a camera that senses two or more images from two or more vantages. As used in this disclosure, a "vantage" is a location of a camera relative a scene, space and/or object which the camera is configured to sense. In one or more embodiments, a stereo-camera may determine depth of an object in a scene as a function of parallax. As used in this disclosure, "parallax" is a difference in perceived location of a corresponding object in two or more images. An exemplary stereo-camera is TaraXL from e-con Systems, inc of San Jose, California. TaraXL is a USB 3.0 stereo-camera which is optimized for NVIDIA® Jetson AGX Xavier™/Jetson™ TX2 and NVIDIA GPU Cards. TaraXL's accelerated Software Development Kit (TaraXL SDK) is capable of doing high quality 3D depth mapping of WVGA at a rate of up to 60 frames per second. TaraXL is based on MT9V024 stereo sensor from ON Semiconductor. Additionally, TaraXL includes a global shutter, houses 6 inertial measurement units (IMUs), and allows mounting of optics by way of an S-mount lens holder. TaraXL may operate at depth ranges of about 50 cm to about 300 cm.

With continued reference to FIG. 1, system 100 and/or machine vision system may include at least an eye sensor. As used in this disclosure, an "eye sensor" is any system or device that is configured or adapted to detect an eye parameter as a function of an eye phenomenon. In one or more embodiments, at least an eye sensor may be configured to detect at least an eye parameter as a function of at least an eye phenomenon. As used in this disclosure, an "eye parameter" is an element of information associated with an eye. Exemplary non-limiting eye parameters may include blink rate, eye-tracking parameters, pupil location, gaze directions, pupil dilation, and the like. Exemplary eye parameters are described in greater detail below. In one or more embodiments, an eye parameter may be transmitted or represented by an eye signal. An eye signal may include any signal described in this disclosure. As used in this disclosure, an "eye phenomenon" may include any observable phenomenon associated with an eye, including without limitation focusing, blinking, eye-movement, and the like. In one or more embodiments, at least an eye sensor may include an electromyography sensor. Electromyography sensor may be configured to detect at least an eye parameter as a function of at least an eye phenomenon.

Still referring to FIG. 1, in one or more embodiments, eye sensor may include an optical eye sensor. Optical eye sensor may be configured to detect at least an eye parameter as a function of at least an eye phenomenon. In one or more embodiments, an optical eye sensor May include a camera directed toward one or both of person's eyes. In one or more embodiments, optical eye sensor may include a light source, likewise directed to person's eyes. Light source may have a non-visible wavelength, for instance infrared or near-infrared. In one or more embodiments, a wavelength may be selected which reflects at an eye's pupil (e.g., infrared). Light that selectively reflects at an eye's pupil may be detected, for instance by camera. Images of eyes may be captured by camera.

Still referring to FIG. 1, an exemplary camera is an OpenMV Cam H7 from OpenMV, LLC of Atlanta, Georgia, U.S.A. OpenMV Cam includes a small, low power, micro-controller which allows execution of processes. OpenMV Cam comprises an ARM Cortex M7 processor 108 and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detect motion, for example by way of frame differencing algorithms; detect markers, for example blob detection; detect objects, for example face detection; track eyes; detection persons, for example by way of a trained machine learning model; detect camera motion, for example by way of optical flow detection; detect and decode barcodes; capture images; and record video.

Still referring to FIG. 1, in one or more embodiments, a camera may be used to determine eye patterns (e.g., track eye movements). For instance, camera may capture images and processor 108 (internal or external) to camera may process images to track eye movements. In one or more embodiments, a video-based eye tracker may use corneal reflection (e.g., first Purkinje image) and a center of pupil as features to track overtime. A more sensitive type of eye-tracker, a dual-Purkinje eye tracker, may use reflections from a front of cornea (i.e., first Purkinje image) and back of lens (i.e., fourth Purkinje image) as features to track. A still more sensitive method of tracking may include use of image features from inside eye, such as retinal blood vessels, and follow these features as the eye rotates. In one or more embodiments, optical methods, particularly those based on video recording, may be used for gaze-tracking and may be non-invasive and inexpensive. For instance, in one or more embodiments a relative position between camera and person may be known or estimable. Pupil location may be determined through analysis of images (either visible or infrared images). In one or more embodiments, camera may focus on one or both eyes and record eye movement as viewer looks. In one or more embodiments, eye-tracker may use center of pupil and infrared/near-infrared non-collimated light to create corneal reflections (CR). A vector between pupil center and corneal reflections can be used to compute a point of regard on surface (i.e., a gaze direction). In one or more embodiments, a simple calibration procedure with an individual person may be needed before using an optical eye tracker. In one or more embodiments, two general types of infrared/near-infrared (also known as active light) eye-tracking techniques can be used: bright-pupil (light reflected by pupil) and dark-pupil (light not reflected by pupil). Difference between bright-pupil and dark pupil images may be based on a location of illumination source with respect to optics. For instance, if illumination is coaxial with optical path, then eye may act as a retroreflector as the light reflects off retina creating a bright pupil effect similar to red eye. If illumination source is offset from optical path, then pupil may appear dark because reflection from retina is directed away from camera. In one or more embodiments, bright-pupil tracking creates greater iris/pupil contrast, allowing more robust eye-tracking with all iris pigmentation, and greatly reduces interference caused by eyelashes and other obscuring features. In one or more embodiments, bright-pupil tracking may also allow tracking in lighting conditions ranging from total darkness to very bright.

With continued reference to FIG. 1, processor 108 is configured to receive metadata 120 associated with a plurality of video streams. A "video stream" as described in this disclosure refers to information containing video-related content. In one or more embodiments, video stream 124 may refer to a data structure or a transmission that delivers video content over a network. In one or more embodiments, video stream 124 may include advertising content, entertainment content, live broadcasts, or on-demand video. In one or more embodiments, video stream 124 may be received from one or more networks, websites, video streaming platforms 128 and/or the like. In one or more embodiments, video stream 124 may include a collection of still or moving images that are received over a network. In one or more embodiments, video stream 124 may include a wide variety of content, including but not limited to advertising videos, live broadcasts, on-demand programming, user-generated content, or interactive media. In one or more embodiments, video stream 124 may include both video content and associated delivery information necessary to render and measure the video content. In one or more embodiments, video streams may originate from one or more streaming platforms 128. A "streaming platform" as described in this disclosure refers to a service or infrastructure that hosts and delivers video content. Streaming platforms 128 can include, but are not limited to, connected television (CTV) providers, over-the-top (OTT) services, video-on-demand platforms, social media networks, or online video sharing services. In one or more embodiments, streaming platforms 128 may include subscription-based services, ad-supported streaming services, live broadcast or simulcast platforms, and social media feeds that embed video advertising. In one or more embodiments, each streaming platform 128 may contain distinct delivery protocols, audience segmentation methods, and content-serving mechanisms.

With continued reference to FIG. 1, video stream 124 may contain associated metadata 120. "Metadata" as described in this disclosure refers broadly to descriptive information associated with a video stream 124. In one or more embodiments, metadata 120 may include identifiers such as campaign IDs or creative IDs, delivery metrics such as impressions, completed views, or click-through rates, performance indicators such as cost per acquisition or return on ad spend, and temporal data such as timestamps, daypart information, or campaign flight dates. In one or more embodiments, metadata 120 may also include contextual signals such as platform type, device class, or audience engagement measures. In one or more embodiments, metadata 120 may also include contextual information, such as device type, geographic location, audience demographics, or time-of-day indicators. In one or more embodiments, metadata 120 may indicate how many people has viewed a particular video stream 124 on a particular streamlining platform, how many people have interacted with a weblink associated with a given video stream 124 and/or the like. In one or more embodiments, processor 108 is configured to receive metadata 120 associated with each video stream 124 of a plurality of video streams which are situated on one or more streaming platforms 128. In one or more embodiments, processor 108 may receive metadata 120 through application programming interfaces, message queues, batch file transfers, real-time event streams and/or the like. In one or more embodiments, video streams may be situated one or more streamlining platforms and configured to provide video content to individuals. In one or more embodiments, metadata 120 may indicate how video streams are performing on streamlining platforms by providing information such as user engagement, user interaction, user visibility, video lag, bitrate errors and/or any other issues that may inhibit an individual from viewing a particular video stream 124. In one or more embodiments, metadata 120 may include information associated with network performance, information associated with demographics of individuals viewing video stream 124, With continued reference to FIG. 1, each video stream 124 is associated with a respective weighting 132. A "weighting" as described in this disclosure is a value that specifies a proportion of an overall amount. For example and without limitation, a weighting 132 may include '0.5' wherein the weighting 132 may indicate that a particular component contains about 50% of an overall amount. In one or more embodiments, weighting 132 may be expressed as a numerical value, a fraction a percentage and/or the like. In one or more embodiments, weighting 132 may specific a portion of a particular resource, such as for example, bandwidth allocation. For example, a video stream 124 may contain a weighting 132 of 50% with respect to bandwidth allocation, wherein the weighting 132 may indicate that the video stream 124 currently utilizes 50% of available bandwidth. In one or more embodiments, weightings may include values indicating how a particular resource should be distributed. For example, and without limitation, multiple video streams may each have a weighting 132 wherein the weighting 132 may indicate a percentage of all data being transferred, a percentage of network utilization in comparison to a whole and/or the like.

With continued reference to FIG. 1, weighting 132 is associated with a fixed resource. A "fixed resource" as described in this disclosure refers to an asset that has a fixed value. In one or more embodiments, fixed resource may include a finite amount of memory storage, a finite amount of processing power, a finite amount of bandwidth which can be allocated, a finite amount of internet usage and/or the like. In one or more embodiments, fixed resource may include a limited amount of server capacity wherein each video stream 124 may have to share the finite amount of server capacity. In one or more embodiments, fixed resource may include monetary costs such as a budget, daily spending, or insertion order amounts. In one or more embodiments, a resource may be considered 'fixed' in instances in which the overall resource cannot be increased or reduced. In one or more embodiments, each video stream 124 may contain an associated weighting 132 indicating the proportion of said fixed resource that each video stream 124 is entitled to. For example, and without limitation, a fixed resource may include a maximum download speed of 100 megabytes per second, wherein a video stream 124 containing a weighting 132 of 0.30 may be allocated 30% of the total download speed. In one or more embodiments, each video stream 124 is linked to a weighting 132 that directly governs how much of the fixed resource it consumes. The set of weightings across the plurality of video streams defines the overall distribution of the resource pool at any given time. While the process in which assignment of weights may, the relationship remains that each weighting 132 serves as a control parameter tying a specific video stream 124 to its share of a finite resource. In one or more embodiments, each video stream 124 may be allocated a particular proportion of fixed resource. In one or more embodiments, weightings may be assigned prior to processing of system 100. In one or more embodiments, weightings may be assigned on previous iterations of the processing. In one or more embodiments each video stream 124 may contain an equal weighting 132, wherein weightings may be reallocated as described in further detail below. In one or more embodiments, weightings may be provided initially through an input made by a user. A "user" as described in this disclosure refers to an individual responsible for video streams. In one or more embodiments, user may include an individual interested in advertising for a specific product, user may include a computer expert and/or the like. In one or more embodiments, fixed resource may include financial resources such as a particular amount of money allocated. In one or more embodiments, video streams may include advertisements, wherein advertisements may be streamed on multiple streaming platforms 128. In one or more embodiments, each video stream 124 may contain an associated weighting 132 indicating how much financial resources are allocated and thus how long a particular advertisement may continue to run on a streaming platform 128.

With continued reference to FIG. 1, processor 108 is configured to monitor a performance of the plurality of video streams. A "performance" or a "performance data" as described in this disclosure refers to a measurable characteristic that reflects how effective a video stream 124 achieves a particular objective. For example, and without limitation performance (also referred to herein as performance data 136) may indicate how well a video stream 124 can display video content without running into issues associated with bitrate errors, lagging, system crashes and/or the like. In one or more embodiments, performance may be represented through quantitative metrics, qualitative indicators, or derived values that describe user interaction, delivery efficiency, or system utilization. It can be identified by analyzing metadata 120 associated with each video stream 124 and comparing one or more elements of that metadata 120 against thresholds, baselines, forecasts, or contextual expectations. Performance may include a wide range of metrics. For example, performance may include user engagement metrics, wherein user engagement metrics measure may include view-through rate, video completion rate, average watch time, skip rate, replay frequency, click-through rate and/or the like. In one or more embodiments, performance may include conversion-based measures, such as but not limited to cost per acquisition, cost per lead, attributed sales, actions such as sign-ups or app installs and/or the like. In one or more embodiments, performance may include economic efficiency, wherein economic efficiency can be measured through return on ad spend, cost per impression, cost per thousand impressions, or cost per completed view. In one or more embodiments, performance may include delivery quality of a video stream 124, wherein delivery quality may be evaluated by fill rate, pacing adherence, impressions delivered versus contracted, error rates and/or the like. In one or more embodiments, performance may include system or network performance, wherein system or network performance may be captured through bandwidth consumption, buffering frequency, latency, packet loss, computational load and/or the like. In one or more embodiments, performance may be measured based on whether a particular video stream 124 reached a target demographic. For example, performance may incorporate contextual and audience information such as demographic reach, geographic distribution, device types, or exposure frequency within target segments.

With continued reference to FIG. 1, performance may include an interaction metric 140. In one or more embodiments, processor 108 may be configured to monitor performance by identifying at least an interaction metric 140. An "interaction metric" as described in this disclosure is a quantitative measure that captures viewer behavior in response to a video stream 124. For example, and without limitation, interaction metric 140 may indicate how long an individual viewed a video streaming before scrolling through a web page. In one or more embodiments, interaction metric 140 may include a range of actions such as clicks, taps, likes, shares, comments, or other platform-specific engagement signals. In one or more embodiments, interaction metrics 140 can also include swipes, QR code scans, hover interactions, or post-view actions such as app installations or purchases. In one or more embodiments, interaction metrics 140 may be expressed as raw counts, ratios, or composite indices. For example, a click-through rate may be calculated by dividing the number of clicks by the number of impressions, while an engagement rate may combine likes, shares, and comments relative to views. Interaction metrics 140 can also be normalized into indices that weight different actions differently, such as giving higher importance to commenting or sharing than to liking. In one or more embodiments, interaction metrics 140 may be collected from metadata 120 provided by the streaming platform 128 or inferred through linked tracking systems. In one or more embodiments, interaction metrics 140 may be evaluated in absolute terms, tracked as ratios, or analyzed as trends over rolling time windows to detect patterns such as engagement decay or bursts of audience resonance. In one or more embodiments, interaction metrics 140 may be used to distinguish between individuals who passively viewed a video stream 124 and individuals who actively viewed a video stream 124.

With continued reference to FIG. 1, performance may be measured in terms of a quantity of one or more performance indicators derived from metadata 120. A quantity may refer to an absolute count, a normalized rate, or a weighted composite score that reflects viewer engagement, delivery efficiency and/or the like. For example, performance may be expressed as a quantity of impressions served, a quantity of completed views, or a quantity of user interactions such as clicks, shares, or comments. In one or more embodiments, performance may be measured as a quantity of conversions, such as application installs, purchases, or other downstream actions attributable to exposure of the video stream 124. In one or more embodiments, performance may be expressed in terms of economic quantities, such as total spend, cost per acquisition, or return on ad spend, where the quantity reflects monetary efficiency or effectiveness. In one or more embodiments, performance may be evaluated by quantities related to system utilization, such as bandwidth consumed, data throughput achieved, or processing cycles required to deliver the stream. These quantities may be measured directly from raw metadata 120, derived through ratio calculations (for example, dividing conversions by impressions to calculate conversion rate), or aggregated over a defined temporal interval to capture trends and stability.

With continued reference to FIG. 1, performance of video streams may be monitored and measured using metadata 120 by treating metadata 120 as a structured record of how each video stream 124 is behaving over time. Each metadata 120 entry may contain raw metrics (such as impression counts, completed views, click-throughs, conversions, or spend), contextual indicators (such as audience segment, time of day, or platform type), and derived values (such as cost per acquisition or return on ad spend). In one or more embodiments, processor 108 may evaluate these fields directly or transform them into performance indicators that allow comparison across streams. In one or more embodiments, performance may be calculated through ratio-based metrics, such as dividing the number of completed views by total impressions to obtain a completion rate or dividing total conversions by spend, to obtain cost efficiency. In one or more embodiments, Performance can also be expressed in normalized terms, where values are scaled against baselines, industry benchmarks, or historical averages, enabling system to flag when a stream is underperforming relative to expectations. In one or more embodiments, metadata 120 may be aggregated over rolling time windows to smooth volatility and reveal trends or evaluated at fine-grained intervals for real-time responsiveness. Statistical measures, such as moving averages, variance, or z-scores, may be applied to determine whether current values deviate meaningfully from expected ranges. In more advanced implementations, the metadata 120 may be input into predictive models that estimate future outcomes, allowing the processor 108 to judge whether performance is on a declining trajectory even before thresholds are crossed.

With continued reference to FIG. 1, in one or more embodiments, metadata 120 may include information within a defined temporal interval. A "defined temporal interval" as described in this disclosure refers to a specified period of time during which data is collected. In one or more embodiments, defined temporal interval may include an hour, a day, a week month and/or the like. In one or more embodiments, defined temporal interval may be expressed in absolute terms (for example, one second, one minute, one hour, one day, one week, or one month) or in relative terms (for example, a rolling 24-hour window, the duration of a campaign, or the time elapsed since a prior adjustment of weighting 132). A defined temporal interval may be fixed or variable. In one or more embodiments, a fixed interval remains constant across monitoring cycles (e.g., always five minutes or always one day), while a variable interval may adapt based on context, such as increasing granularity during high-traffic periods and broadening during low-traffic periods. In one or more embodiments, intervals can be overlapping or sliding windows, which continuously update as new metadata 120 arrives, or discrete blocks, where performance data is segmented into non-overlapping units of time. In one or more embodiments, metadata 120 may be collected with respect to defined temporal interval. For example, metadata 120 may include impression counts per hour, engagement rates over rolling 24-hour windows, or conversion data accumulated over weekly intervals.

With continued reference to FIG. 1, metadata 120 may include information within a defined temporal interval. In one or more embodiments, processor 108 may be configured to project future interaction metrics for each video stream 124 based on information contained within metadata 120. In one or more embodiments, performance may include projected future interaction metrics which indicate projected trends in interaction metrics 140. A "future interaction metric" as described in this disclosure is a forecasted value that represents an expected level of viewer engagement at a later date or time. For example and without limitation, future interaction metric may indicate that viewer engagement may drop 30% over the course of a month based on trends identified in metadata 120. In one or more embodiments, future interaction metrics may be generated using statistical forecasting methods, time-series models, regression analysis, or machine-learning-based prediction techniques as described in this disclosure. For example, and without limitation, processor 108 may project that a completion rate currently at 70% is trending downward and will fall below 60% within the next day, or that a click-through rate may increase by 5% in a particular audience segment given observed engagement trends. In one or more embodiments, processor 108 may calculate future interaction metric by applying a linear trend projection derived from values contained in metadata 120. For example, if click-through rate within metadata 120 shows a steady decline over consecutive hourly intervals, processor 108 may extrapolate the slope of that decline to forecast a lower click-through rate in the next interval. Alternatively, if engagement rates trend upward, processor 108 may project a higher future value based on the observed slope of increase. In one or more embodiments, processor 108 may employ moving average models to smooth short-term fluctuations and extend the average forward into a subsequent interval. Similarly, exponential smoothing may be applied to place greater weight on more recent metadata 120 values when projecting a future completion rate or engagement score. In one or more embodiments, future interaction metrics may be calculated using ratio-based forecasting, wherein recent changes in metrics such as conversions per impression or likes per view are extrapolated to generate a prediction. In one or more embodiments, processor 108 may be configured to monitor performance by projecting future interaction metrics in order to identify trends in performance and potential changes in the future. In one or more embodiments, processor may be configured to identify future interaction metric as a function of the records and the associated timestamps. In one or more embodiments, metadata may include records and associated timestamps within a defined temporal interval. In one or more embodiments, records with timestamps that are within a particular defined temporal interval may be used to calculate and/or project future interaction metrics. For example, and without limitation, a defined temporal interval representative of a weekend may be used to project future interaction metrics for future weekends. In one or more embodiments, processor may be configured to identify and/or project future interaction metrics for a particular day by utilizing similar days. In one or more embodiments, processor may be configured to break up metadata into multiple temporal intervals, such as by hour day and/or the like and project future interaction metrics for each temporal interval. This will allow for future interaction metrics to contain increased accuracy as similar windows are used to project future interaction metrics.

With continued reference to FIG. 1, in one or more embodiments, each record of metadata 120 may include one or more timestamps that associate the record with the defined temporal interval. Timestamps may include, and without limitation, an event time (when the underlying impression, view, or conversion occurred), a capture time (when the platform generated the record), and an ingest time (e.g. when processor 108 received the record). Timestamps may further include explicit interval boundaries to declare coverage of the record (such as a particular minute, hour, day, or rolling window). In one or more embodiments, timestamps may be normalized to a common time base (e.g., UTC), may carry time-zone metadata, and may be expressed with sub-second precision. Records may also carry sequence identifiers or idempotency keys to support de-duplication and ordering when data arrives out of order. In one or more embodiments, metadata may include one or more records, wherein each record may include a portion of metadata. In one or more embodiments, each record of metadata may include a timestamp. In one or more embodiments, metadata may be within a defined temporal interval, wherein records with a particular timestamp are used. For example and without limitation, a defined temporal interval may include 8:00 am to 4:00 pm, wherein each record containing a timestamp within such interval may be included within metadata. In one or more embodiments, metadata may be received and/or organized based on timestamps. In one or more embodiments, processor may use a particular defined temporal interval for processing. For example, processor may determine user engagement during the day, at night, at a particular hour, on a particular day and/or the like. In one or more embodiments, processor may be given and/or assigned a particular defined temporal interval, wherein processor may extract records with associated timestamps that are within the defined temporal interval. For example, metadata may include information received over a one week timeframe and defined temporal interval may include a particular day on that week. In one or more embodiments, processor may be configured to extract records and associated timestamps for that particular day. In one or more embodiments, this will allow for processor to determine trends for a particular time frame and project future metrics based on those trends.

With continued reference to FIG. 1, in one or more embodiments system 100 may include and/or be communicatively connected to a machine vision system including at least a camera as previously described. In one or more embodiments, processor 108 may be configured to track performance of a video stream 124 using machine vision, wherein performance may include viewer attention inferred from eye movement while the video stream 124 is presented on a display. In one or more embodiments, viewer attention may refer to any measurable indicator that a person is visually attending to the video stream 124, including but not limited to, gaze direction toward the stream, fixation duration within the stream's on-screen region, dwell time, saccade frequency, blink rate, pupillary response, head pose/orientation consistent with viewing and/or the like. In one or more embodiments, the camera may acquire image data of a scene that includes the viewer and the display device. Machine vision system may execute eye-tracking functions such as corneal-reflection detection, pupil/iris segmentation, eyelid contour detection, and feature tracking to estimate a gaze vector in camera coordinates. A calibration procedure may register the gaze vector to a screen coordinate system via homography or affine transforms, thereby defining a region of interest (ROI) corresponding to the on-screen bounds of a specific video stream 124 (e.g., a CTV placement, picture-in-picture window, or tiled stream). In one or more embodiments, processor 108 may computes attention metrics by sampling whether the gaze intersects the ROI over time and aggregating statistics such as time-in-view (cumulative duration gaze resides within the ROI), fixation count and mean fixation duration within the ROI; dwell ratio (time-in-view divided by total stream play time), saccadic velocity and blink rate as indicators of distraction, head pose alignment toward the display, pupil diameter change (when captured with IR illumination) as a proxy for arousal and/or the like. In one or more embodiments, processor 108 may form a composite attention score by weighting 132 these metrics and optionally normalizing by context (distance to display, ambient light, multi-viewer scenarios).

With continued reference to FIG. 1, processor 108 is configured to identify one or more videos streams containing an anomaly 144 by comparing the performance of each of the plurality of video streams to one or more streaming thresholds 148. An "anomaly" as described in this disclosure refers to a condition where data departs from an acceptable state or value. For example, and without limitation, anomaly 144 may include a piece of information within metadata 120 indicating that viewership is significantly reduced or that user engagement has significantly reduced. In one or embodiments, an anomaly 144 may signal underperformance, overperformance, instability, or unexpected fluctuations. In one or more embodiments, anomalies may include performance metrics falling below target values (e.g., completion rate dropping under 70%), exceeding upper bounds (e.g., frequency cap being violated), or behaving erratically relative to historical patterns (e.g., sudden spikes in cost per acquisition). In one or more embodiments, anomaly 144 can indicate inefficiency, waste, technical malfunction, or unusually high performance that may warrant reallocation of resources towards one or more video streams.

With continued reference to FIG. 1, processor 108 is configured to identify video streams containing one or more anomalies by comparing performance and/or performance data or a video stream 124 to one or more streaming thresholds 148. A "streaming threshold" as described in this disclosure refers to boundary values that serve as reference points for acceptable performance. In one or more embodiments, streaming thresholds 148 may indicate minimum requirements, such as a baseline click-through rate or impression count that must be maintained, or maximum allowances, such as an upper cap on frequency or cost. In one or more embodiments, streaming thresholds 148 may also represent ranges, where performance is expected to remain within defined bounds. In one or more embodiments, streaming thresholds 148 may include acceptable ranges for one or more elements within performance data. for example, and without limitation, streaming thresholds 148 may indicate an acceptable range of viewership, an acceptable range of interaction metrics 140, an acceptable amount of clicks needed for a particular video stream 124 and/or the like. For example, a completion rate between 70% and 90% may be considered normal, while values below 70% may indicate underperformance and values above 90% may suggest anomalously high engagement that could justify resource reallocation. Similarly, cost per acquisition may be expected to remain within $30 to $50, with results outside that range correlating to specific outcomes. Specifically, costs above the upper limit may represent inefficiency or waste, while costs below the lower limit may represent exceptional efficiency that warrants increased allocation. In one or more embodiments, streaming thresholds 148 can be calculated using statistical methods such as means and standard deviations, rolling averages, or percentiles, or can be set according to business rules and contractual performance guarantees. In one or more embodiments, streaming thresholds 148 may indicate a particular range of values for each elements within performance data. In one or more embodiments, streaming thresholds 148 may be generated using historical averages generated by previously received metadata 120. In one or more embodiments, streaming thresholds 148 may be generated using metadata 120 containing larger defined temporal intervals, such as for example, data gathered over the span of a year. In one or more embodiments, each video streaming platform may contain differing streaming thresholds 148. For example, a streaming platform 128 that regularly contains a high viewership may contain a higher range of values for streaming thresholds 148. In one or more embodiments, streaming thresholds 148 may be proportional to viewership, wherein for example, streaming thresholds 148 may include a percentage of overall viewership on a platform. In one or more embodiments, streaming thresholds 148 may be generated using standard deviations, wherein ranges may fall within a first standard deviation, a second standard deviation and/or the like.

With continued reference to FIG. 1, processor 108 may be configured to generate a plurality of adjusted thresholds 152 by adjusting one or more streaming thresholds 148 as a function of the weighting 132 of each vide stream. An "adjusted threshold" as described in this disclosure refers to a streaming threshold 148 that has been modified based on an associated weighting 132 of a video stream 124. For example, and without limitation, a streaming threshold 148 may contain a particular viewer count, wherein the adjusted threshold 152 may include a lower viewer count to account for a lower weighting 132. In one or more embodiments, streaming thresholds 148 used to evaluate performance may be adapted according to a relative resource allocation each video stream 124 has received. For example, and without limitation, a video stream 124 with an already small resource allocation may contain a lower range of values in comparison to a video stream 124 within a higher resource allocation. This allows video streams that have been assigned smaller weightings to be evaluated under less stringent criteria, recognizing that a video stream 124 with fewer resources may naturally generate smaller raw numbers while still performing efficiently relative to its share. Conversely, video streams with larger weightings may be expected to sustain higher absolute performance and therefore have stricter thresholds for success and earlier triggers for detecting underperformance. For example, a base streaming threshold 148 for completion rate may be set at 70%. If a given video stream 124 is associated with a weighting 132 of only 5%, processor 108 may apply a downward adjustment to that threshold, such that the adjusted threshold 152 is 60%. In this case, the lower threshold acknowledges that with a limited allocation of resources, smaller fluctuations in performance should not be treated as anomalies. In contrast, a heavily weighted stream consuming 40% of the fixed resource may have its threshold adjusted upward to 75% or 80%, reflecting the need for stricter oversight due to its higher impact on overall campaign efficiency. The adjustment function that relates weighting 132 to threshold modification may be implemented in multiple ways. In one or more embodiments, adjustment may be linear, where thresholds are increased or decreased by a factor directly proportional to the weighting percentage. In one or more embodiments, the function may be nonlinear, such as applying logarithmic scaling, exponential scaling, or tiered bands, so that video streams above a certain weighting 132 tier are subjected to disproportionately stricter thresholds. The adjustment may also be bounded by minimum and maximum caps to ensure that thresholds remain within practical ranges, regardless of extreme weightings. Once the plurality of adjusted thresholds 152 is generated, the performance of each video stream 124 is compared to its own individualized and adjusted threshold 152, rather than to a uniform standard. This enables a more context-sensitive evaluation of anomalies, ensuring that smaller-weighted video streams are not prematurely penalized and that higher-weighted streams are scrutinized more carefully. In one or more embodiments, this framework may allow for processor 108 to create a graduated scale of expectations across video streams, where resource allocation and performance standards are interdependent. In one or more embodiments, processor 108 may be configured to receive a particular streaming threshold 148, adjust the streaming threshold 148 based on an associated weighting 132 of a particular video stream 124 and compare performance of said video stream 124 to the adjusted threshold 152.

With continued reference to FIG. 1, processor 108 is configured to identify video streams containing anomalies. In one or more embodiments, video streams containing anomalies may include video streams within performance data that fall outside a given range of values as indicated by streaming threshold 148 and/or adjusted threshold 152. In one or more embodiments, anomalies may include video streams that are performing better than expected, video streams that are performing worse than expected and/or the like. In one or more embodiments, identification of anomalies may allow for processor 108 to properly allocated resources to each video stream 124 in order to accommodate for changes in performance. For example and without limitation, a video stream 124 having higher viewer engagement may be allocated increased computational, network and/or financial resources.

With continued reference to FIG. 1, anomaly 144 may be represented as a delta value which reflects a difference between an observed metric and its corresponding threshold, baseline, or target value. The delta can be expressed as an absolute difference, a percentage deviation, or a normalized score. In one or more embodiments, anomaly 144 may be defined as a distance measure from within a valid range, such that values close to breaching a threshold are flagged as anomalous even before the boundary is crossed. In one or more embodiments, anomaly 144 may also include probabilistic or confidence-based indicators, such as a likelihood that the observed metric will exceed or fall below a threshold within a defined time window. In one or more embodiments, anomalies may not limited to binary determinations of "in" or "out" of range but may also include graded or continuous measures of deviation that quantify how close a performance metric is to violating a condition. These representations may for system 100 to identify not only clear cases of underperformance or overperformance, but also early-warning signals where performance is trending toward undesirable states.

With continued reference to FIG. 1, processor 108 is configured to reallocate fixed resource. In one or more embodiments, processor 108 may reallocate fixed resource wherein video streams may be allocated a larger or smaller portion of fixed resource. For example, and without limitation, video streams may be allocated an increase in bandwidth, an increase in memory, an increase in finances and/or the like. In one or more embodiments, fixed resources are allocated by adjusting weightings for each video stream 124 of one or more video streams. For example, and without limitation, a video stream 124 may contain a weighting 132 of 0.3 or 30%, wherein reallocation may result in weighting 132 being increased to 0.4 or 40%. As a result, a particular video stream 124 on a particular streaming platform 128 may contain increased bandwidth increased financial advantages and/or the like. In one or more embodiments, fixed resource may include ad spending, wherein a particular amount is allocated for advertising spending. In one or more embodiments, each video stream 124 may be allocated a particular amount of the total advertising spending, wherein processor 108 may reallocate spending based on viewership, interaction and/or the like. In one or more embodiments, weightings are adjusting as a function of the anomaly 144. In one or more embodiments, processor 108 may adjust a weighting 132 of a video stream 124 in which an anomaly 144 is identified. For example, and without limitation, a performance indicating that viewer engagement is lower than expected may result in the generation of an anomaly 144 and subsequently in reallocation of fixed resource to a video stream 124 with higher than expected viewer engagement.

With continued reference to FIG. 1, reallocation of fixed resource may be performed through rule-based adjustments. In one or more embodiments, processor 108 may be configured to execute predefined conditional logic functions that directly map anomalies to specific changes in weighting 132. For example, processor 108 may execute an 'if/then' function such that: if completion rate <70%, then decrease weighting 132 of that stream by 10% and increase weighting 132 of the highest-performing stream by the same amount. Other rules may employ proportional functions, where processor 108 may calculate the magnitude of reallocation as a percentage of a delta between an observed performance value and its corresponding threshold. In one or more embodiments, Tiered logic functions may also be used, wherein smaller anomalies result in minor reallocations (e.g., ±5%) while larger anomalies trigger more substantial reallocations (e.g., ±20%). In one or more embodiments, rules executed by processor 108 may be stored in memory as configurable parameters and applied automatically as anomalies are detected. In one or more embodiments, reallocation may be determined through optimization algorithms that compute updated weightings by maximizing an objective function subject to constraints. In one or more embodiments, processor 108 may execute a linear or non-linear optimization function. The function $f(w)$ may be designed to optimize return on ad spend, total conversions, or engagement levels. In one or more embodiments, processor 108 may apply techniques such as gradient descent, simplex optimization, or simulated annealing to solve for optimal weightings. In one or more embodiments, optimization may consider not only immediate anomalies but also projected future performance, incorporating time-series forecasts as constraints. In one or more embodiments, outputs may include a vector of updated weights that are normalized to conserve fixed resource while improving aggregate performance. In one or more embodiments, reallocation may be performed using proportional redistribution methods. Processor 108 may calculate a redistribution function that decreases weightings of video streams with anomalies indicating lower than expected performance and increases weightings of video streams with anomalies associated with better than expected performance (in comparison to a threshold). In one or more embodiments, updated weights may be renormalized so that their sum equals the fixed resource. In one or more embodiments, system 100 may incorporate guardrails or constraints to ensure stable and reliable reallocations. For example, processor 108 may enforce minimum and maximum bounds for each video stream's weighting 132, thereby preventing any video stream 124 from being starved or overallocated. In one or more embodiments, processor 108 may also apply step-size limitations to avoid volatile swings. Pacing functions may be used to spread reallocations over time, such that a larger adjustments are implemented incrementally across multiple intervals. In one or more embodiments, the processor 108 may incorporate safety checks that require anomalies to persist for a defined duration before reallocations are enacted, thereby reducing reactions to noise.

With continued reference to FIG. 1, processor 108 may utilize one or more machine learning models to generate reallocations. For example, processor 108 may input a feature vector 160 for each stream, including engagement metrics, spend data, audience characteristics, creative identifiers, anomaly 144 indicators and/or the like into a trained model. The machine learning model may be a regression ensemble, a neural network, a contextual bandit, a reinforcement learning policy and/or any other machine learning model as described in this disclosure. The output of the machine learning model may include an allocation score 164 representing a predicted marginal gain from allocating additional resources to that stream, and an uncertainty measure representing confidence in that prediction. In one or more embodiments, processor 108 may apply a transformation function, such as a softmax normalization across allocation scores 164, to generate updated weightings. In reinforcement learning, processor 108 may update the model parameters based on observed outcomes of prior reallocations, thereby creating a feedback loop that improves future allocation decisions.

With continued reference to FIG. 1, in one or more embodiments, computing device 104 may use a machine learning model such as an adjustment machine learning model 156 to generate weightings and/or adjust weightings. In one or more embodiments, an adjustment machine learning model 156 may be configured to receive metadata 120, anomalies performance and/or the like and output weightings and/or adjustments to weightings in order to reallocated fixed resource. In one or more embodiments, an initial set of weightings may be generated by a user, 3rd party and/or the like. In one or more embodiments, adjustment machine learning model 156 may be configured to output an initial set of weightings regardless metadata 120, performance and/or the like. In one or more embodiments, adjustment machine learning model 156 may then be trained using a data set containing a plurality of historical inputs correlated to a plurality of historical weightings and/or adjustments. In one or more embodiments, plurality of historical inputs may include metadata 120, performance, anomalies and/or the like used on previous iterations of the processing. In one or more embodiments, adjustment machine learning model 156 may be trained to correlate various inputs such as anomalies to various weightings and/or adjustments. In one or more embodiments, a particular anomaly 144, such as a lower viewer engagement may be correlated to a particular weighting 132. For example, and without limitation, an anomaly 144 that indicates that performance is 2% lower than a range of values indicated by performance threshold may be correlated to a particular decrease in weighting 132.

In one or more embodiments, the adjustment machine learning model 156 may be configured to minimize a loss function that represents a difference between expected campaign outcomes predicted by the model and actual outcomes observed following a reallocation of the fixed resource. The loss function may be defined to capture one or more campaign objectives, such as maximizing engagement, minimizing cost per acquisition, improving return on ad spending, or balancing delivery across audience segments. The loss function may further include penalty terms to discourage excessive volatility in reallocations or to enforce minimum and maximum weighting 132 constraints. By minimizing the loss function across historical and real-time inputs, the adjustment machine learning model 156 may iteratively refine its ability to output weightings that more closely align with desired performance objectives.

With continued reference to FIG. 1, in one or more embodiments, processor 108 may first convert metadata 120, performance anomalies and/or any other data as described in this disclosure into a feature vector 160 prior to input into adjustment machine learning model 156.

With continued reference to FIG. 1, a "vector" as defined in this disclosure is a data structure that represents one or more a quantitative values. Such vector and/or embedding may include and/or represent an element of a vector space. A vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors. However, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute 1 as derived using a Pythagorean norm:

$$l = \sqrt{\sum_{i=0}^{n} a_i^2},$$

where ai is attribute number i of the vector. Scaling and/or normalization may function to make vector comparison independent of absolute quantities of attributes, while preserving any dependency on similarity of attributes. A two-dimensional subspace of a vector space may be defined by any two orthogonal vectors contained within the vector space. Two-dimensional subspace of a vector space may be defined by any two orthogonal and/or linearly independent vectors contained within the vector space; similarly, an n-dimensional space may be defined by n vectors that are linearly independent and/or orthogonal contained within a vector space. A vector's "norm' is a scalar value, denoted |α| indicating the vector's length or size, and may be defined, as a non-limiting example, according to a Euclidean norm for an n-dimensional vector α as:

$$\|a\| = \sqrt{\sum_{i=0}^{n} a_i^2}$$

With continued reference to FIG. 1, in one or more embodiments, processor 108 may be configured to convert metadata 120, performance data, anomalies, and/or any other information described herein into a feature vector 160. A "feature vector" as described in this disclosure refers to a representation if information expressed as a numerical array or multi-dimensional vector, which is suitable for processing by a machine learning model. In one or more embodiments, feature vector 160 may enables heterogeneous types of data to be encoded into a standardized format that facilitates efficient computation, statistical analysis, and predictive modeling. For example, and without limitation feature vector 160 may allow for data such as images and text to be combined into a single representation and allow for a machine learning model to generate outputs. A feature vector 160 may encompass a wide range of information associated with video streams. In one or more embodiments, elements of feature vector 160 may include identifiers such as campaign ID, platform ID, or creative ID. Elements of feature vector 160 may further include delivery metrics such as impressions served, pacing value, or budget utilization. Elements of feature vector 160 may further include engagement measures such as view-through rate, completion rate, or click-through rate. Elements of feature vector 160 may further include conversion measures such as cost per acquisition, return on ad spending, or attributed conversions. In other embodiments, feature vector 160 may include system-level indicators such as bandwidth utilization, latency, buffering events, packet loss, or processor 108 load. In one or more embodiments, feature vector 160 may include contextual attributes such as device type, geographic location, or time of day. In one or more embodiments, feature vector 160 may include anomaly 144 descriptors such as deltas from thresholds, probabilities of threshold breach, or proximity-to-baseline scores. Feature vectors 160 may also include historical or temporal features, such as rolling averages, moving standard deviations, or lagged values that capture recent trends.

With continued reference to FIG. 1, in one or more embodiments, processor 108 may generate feature vectors 160 through processes such as normalization, encoding, and/or transformation. For example, categorical variables such as platform or device type may be one-hot encoded, numerical variables may be scaled or normalized, and missing values may be imputed using statistical methods. In one or more embodiments, derived features may be calculated, such as ratios (e.g., conversions per impression), differences from thresholds (e.g., anomaly 144 deltas), or aggregated statistics across groups of streams. These transformations may ensure that the resulting feature vector 160 is both consistent in format and representative of underlying campaign and system conditions. In one or more embodiments, Feature vectors 160 may allow for increased efficiency and accuracy for adjustment machine learning model 156 because they provide a structured, quantitative input that captures a rich set of attributes in a compact, processable form. By embedding diverse information into vectors, adjustment machine learning model 156 can efficiently learn correlations between anomalies and optimal weighting 132 adjustments. Feature vectors 160 may allow for dimensionality reduction and efficient storage, supporting faster training and inference. Moreover, because feature vectors 160 can be continuously updated with new data, they enable the adjustment machine learning model 156 to adapt in near real time to evolving conditions. The use of feature vectors 160 thus facilitates accurate, scalable, and flexible learning, allowing the processor 108 to reallocate fixed resources dynamically in a manner that is grounded in both historical patterns and current performance observations.

With continued reference to FIG. 1, in one or more embodiments, adjustment machine learning model 156 may generate updated weightings by applying a loss function to feature vectors 160 derived from metadata 120, performance indicators, and anomalies. The resulting updated weightings may be stored alongside contextual information, such as timestamp, platform identifier, audience segment, or creative identifier, to form a structured record of each reallocation event. These records may be indexed in a database 116 for subsequent retrieval, enabling the system to trace back prior adjustments and their outcomes for validation, auditing, or additional training. In one or more embodiments, adjustment machine learning model 156 may utilize different functional forms to guide reallocation. For example, adjustment model may implement a regression-based approach to estimate marginal gains from additional allocation, a reinforcement learning policy that outputs updated weightings based on observed rewards from prior reallocations, or a bandit-based approach that balances exploitation of known high-performing streams with exploration of under-tested streams. In one or more embodiments, adjustment machine learning model 156 may output both an allocation score 164 and an associated confidence measure, and the processor 108 may use these outputs jointly to adjust weightings conservatively when uncertainty is high and more aggressively when uncertainty is low. In one or more embodiments, the adjustment machine learning model 156 may further be trained in an iterative feedback loop. Following each reallocation, post-adjustment performance data may be ingested as new input, allowing adjustment machine learning model 156 to assess whether the adjustment improved or degraded performance relative to baselines or thresholds. In one or more embodiments, adjustment machine learning model 156 may then update its parameters accordingly, such that correlations between anomalies and effective weighting 132 adjustments are reinforced over time. For example, an anomaly 144 indicating a 2% decline in completion rate may become increasingly associated with a particular downward adjustment of weighting 132 if repeated evidence supports that such action restores performance.

With continued reference to FIG. 1, processor 108 may be configured to input a feature vector 160 representative of each video stream 124 of the plurality of video streams into an adjustment machine learning model 156, generate, using the adjustment machine learning model 156, an allocation score 164 and an uncertainty measurement 168 for each feature vector 160 and adjust the weighting 132 of each video stream 124 based on the allocation score 164 and the uncertainty measurement 168. An "allocation score" as described in this disclosure refers to a quantitative output that represents an adjustment to a weighting 132. For example, and without limitation, the allocation score 164 may include 20%, wherein allocation score 164 may indicate that a new weighting 132 should be 20% and/or increased by 20%. In one or more embodiments, allocation score 164 may capture a prediction of performance improvement, a utility value based on multiple campaign objectives, or a ranking index derived from correlations in the training data. Allocation scores 164 may be expressed as raw numerical values, normalized probabilities, or marginal return estimates (e.g., expected increase in engagement or decrease in cost per acquisition per unit of additional allocation). In one or more embodiments, allocation score 164 is computed as a function of the feature vector 160, wherein performance metrics, anomalies, and contextual inputs collectively inform adjustment machine learning model's prediction of how effective further allocation to that stream would be. An "uncertainty measurement" as described in this disclosure refers to an output that quantifies the confidence or reliability associated with the allocation score 164. The uncertainty measurement 168 may be represented as a variance, a confidence interval, a probability distribution spread, an ensemble disagreement score, or any measure that reflects the degree of certainty in the model's prediction. For example, and without limitation, adjustment machine learning model 156 may output an uncertainty measurement 168 of 'high' or '80%' wherein the uncertainty measurement 168 may indicate that the generated allocation score 164 has a high likelihood of success when implemented. In one or more embodiments, the uncertainty measurement 168 may be derived from probabilistic models, Bayesian inference, bootstrapped sampling, or ensemble methods. In one or more embodiments, uncertainty measurement 168 may provide a mechanism for tempering allocation decisions and ensuring that reallocation actions are not based on unstable or low-confidence predictions.

With continued reference to FIG. 1, adjustment machine learning model 156 may combine allocation score 164 and uncertainty measurement 168 to determine an updated weighting 132 for each video stream 124. In one or more embodiments, processor 108 may apply a transformation function such as a softmax normalization, in which allocation scores 164 are scaled across all streams and then adjusted according to their associated uncertainty. For example, a stream with a high allocation score 164 but high uncertainty may receive a smaller weighting 132 adjustment than a stream with a moderately high score and low uncertainty. In one or more embodiments, system 100 may apply risk-adjusted scoring, wherein processor 108 computes a modified score equal to the allocation score 164 minus a penalty proportional to the uncertainty measurement 168. Additionally or alternatively, system 100 may use probability-of-improvement methods, wherein weightings are adjusted based on the likelihood that a given stream will outperform its current allocation.

With continued reference to FIG. 1, adjustment machine learning model 156 may include training data of a plurality historical feature vectors 160 correlated to a plurality of historical allocation scores 164 and uncertainty measurements 168. The historical feature vectors 160 may represent previous inputs provided to adjustment machine learning model 156, wherein each feature vector 160 contains encoded metadata 120, performance metrics, anomalies, and contextual attributes associated with one or more video streams at a given time. The corresponding historical allocation scores 164 and uncertainty measurements 168 may represent previous outputs generated by adjustment machine learning model 156 in response to those inputs, indicating how resources were recommended to be distributed and the confidence associated with those recommendations. The pairing of historical inputs (feature vectors 160) with historical outputs (allocation scores 164 and uncertainty measurements 168) forms a structured training dataset. In one or more embodiments, the training dataset may be compiled and stored in memory as a sequence of input-output examples that adjustment machine learning model 156 can use to learn correlations between observed conditions and optimal resource reallocations. By repeatedly exposing adjustment machine learning model 156 to these historical examples, adjustment machine learning model 156 can identify patterns, such as which anomalies tend to predict successful reallocations, which contextual factors influence allocation effectiveness, and how uncertainty measurements 168 should vary with different data conditions. In one or more embodiments, the training process may be iterative. Following each new reallocation in a live environment, system 100 may capture feature vectors 160 that led to the adjustment, the allocation score 164 and uncertainty measurement 168 that were generated, and the actual performance outcomes observed after the adjustment was applied. These newly generated input-output pairs may then be incorporated back into the training dataset. The adjustment machine learning model 156 may periodically or continuously retrain on the expanded dataset, refining its parameters to improve accuracy over time. This iterative process allows the model to evolve in response to changing campaign dynamics, audience behaviors, and platform conditions.

With continued reference to FIG. 1, In one or more embodiments, adjustment machine learning model 156 may be trained by identifying at least one video stream 124 associated with a prior weighting 132 adjustment that was generated by the adjustment machine learning model 156, comparing a current performance of the at least one video stream 124 to a previous performance associated with the prior weighting 132 adjustment and updating parameters of the adjustment machine learning model 156 in an automated feedback loop based on a delta between the current performance and the previous performance. In one or more embodiments, processor 108 may first identify one or more video streams for which a weighting 132 adjustment was previously recommended and applied by the adjustment machine learning model 156. Each identified stream may be associated with a record of the feature vector 160 input to the model, the allocation score 164 and uncertainty measurement 168 output by the model, and the resulting weighting 132 adjustment enacted. These records may serve as reference points for evaluating the effectiveness of prior adjustments. Processor 108 may then compare a current performance measure (e.g., performance identified during a current interaction) of the identified stream with a previous performance measure (performance identified on a prior date) associated with the prior adjustment. For example, if weighting 132 was increased for a given video stream 124 on a prior date, processor 108 may examine whether engagement, cost efficiency, or delivery metrics improved relative to the baseline performance before the adjustment. This comparison may be expressed as a delta value, representing the magnitude and direction of change. The delta may be calculated as an absolute difference, a percentage deviation, or a normalized score relative to a performance threshold or baseline range. Based on the computed delta, adjustment machine learning model 156 may update its internal parameters to improve future predictions. Parameters may include weights of regression coefficients, neural network connection strengths, ensemble voting weights, or policy parameters in reinforcement learning models. Updates may occur through established training techniques such as gradient descent, backpropagation, stochastic updates, or Bayesian posterior updates, depending on the model architecture. In one or more embodiments, processor 108 may adjust these parameters so that input patterns (e.g., anomalies, metadata 120 features) associated with positive deltas reinforce similar future allocation recommendations, while input patterns associated with negative deltas reduce the likelihood of repeating ineffective reallocations. In one or more embodiments, this process may be performed in an iterative feedback loop. Following each cycle of reallocation, new deltas are calculated and incorporated into the training process, progressively refining the model's ability to map feature vectors 160 and anomalies to effective weighting 132 adjustments. Over time, adjustment machine learning model 156 may develop an increasingly accurate correlation between observed conditions and reallocation outcomes, enabling adjustment machine learning model 156 to anticipate the impact of resource distribution decisions with greater precision and confidence.

With continued reference to FIG. 1, fixed resource may be re-allocated in real time. "Real time" as described in this disclosure refers to updates that occur substantially concurrently with, or within a short interval following, the detection of an anomaly 144 or change in performance. Real-time adjustment may allow for system 100 to respond immediately to fluctuations in engagement, cost efficiency, delivery pace, or technical conditions such as bandwidth availability, without waiting for batch intervals or manual intervention. In one or more embodiments, real-time adjustment may involve the continuous ingestion of metadata 120 and performance data from streaming platforms 128 through event streams, APIs, or message queues. Processor 108 may analyze this incoming data in rolling windows or on a per-event basis, detecting anomalies and recalculating weightings as new inputs are received. Updated weightings may then be transmitted to delivery systems, ad servers, or platform APIs, ensuring that the fixed resource distribution is updated dynamically and with minimal latency. In one or more embodiments, real-time adjustment may be performed using streaming analytics functions such as online machine learning algorithms, incremental optimization solvers, or rule-based triggers that operate on a per-impression or per-view basis. For example, processor 108 may reduce weighting 132 of a video stream 124 within seconds of detecting that a completion rate has fallen below a threshold, reallocating that portions of fixed resource to another stream currently outperforming expectations. In one or more embodiments, real-time reallocation may also incorporate stability mechanisms, such as rate-limiters or pacing controls, to prevent excessive oscillation in weightings. For example, processor 108 may enforce a maximum percentage change in weighting 132 per unit time, ensuring that reallocations remain responsive but not erratic. In some embodiments, guardrails such as minimum and maximum allocations per stream may also be applied to prevent starvation or over-saturation of resources.

With continued reference to FIG. 1, in one or more embodiments, allocation of fixed resource may be performed by a third-party delivery platform, wherein system 100 may communicate proposed reallocations via application programming interfaces (APIs). In one or more embodiments, processor 108 may transmit updated weightings to the third party using authenticated API calls (e.g., OAuth-based or signed requests), optionally including an idempotency key and a correlation identifier for audit. The request may specify one or more target identifiers for the affected video streams 124 (e.g., platform-specific stream/video IDs), the old and new weighting values, an effective time (immediate or scheduled), an optional reason code referencing the anomaly 144 that triggered the change and/or the like. The third-party platform may acknowledge with a response that includes a status, version, and timestamp. In one or more embodiments, processor 108 may implement retry, back-off, and dead-letter handling to address transient network or rate-limit conditions. In one or more embodiments, a "preview" or "dry-run" mode allows validation of payloads without applying changes.

With continued reference to FIG. 1, in one or more embodiments, metadata 120 may be received via API requests from multiple streaming platforms 128 and may include platform-native identifiers that uniquely reference content and accounts. Non-limiting examples include a video or stream identifier (e.g., a YouTube videoId, a Twitch stream_id), a channel/creator identifier (e.g., YouTube channelId, Twitch broadcaster_id), a playlist/collection identifier, a line-item or placement identifier, and associated campaign identifiers. These identifiers may enable processor 108 to correlate incoming performance metrics, interaction metrics 140, and current weightings 132 to specific objects on the originating platforms. When communicating reallocations to a third party, the same identifiers may be included in the outbound API payload so the external system can resolve precisely which video, stream, channel, or placement is to receive the updated weighting.

With continued reference to FIG. 1, in one or more embodiments, weightings 132 may apply at multiple hierarchy levels, including per-video/stream, per-channel/creator, per-playlist/collection, or per-platform. A channel/creator-level weighting may act as a multiplier or budget partition that governs the aggregate allocation for all videos associated with the channel, while video-level weightings apportion the channel's share among individual assets. In some embodiments, propagation rules may be defined such that underperformance of a particular video reduces its own weighting and optionally decrements a channel-level weighting (e.g., by a bounded amount) to reflect broader audience fatigue, with exception lists permitting specific videos to be insulated from channel-level changes. Conversely, channel-level outperformance may increase its pool while video-level allocations are re-normalized within that pool according to current allocation scores.

With continued reference to FIG. 1, in one or more embodiments, reallocating fixed resource may include transmitting a validation permission 172 through a graphical user interface and reallocating the fixed resource as a function of a response associated with the validation permission 172. A "validation permission" as described in this disclosure refers to an electronic instruction or notification indicating proposed changes to weightings. In one or more embodiments, validation permission 172 may include supporting information such as allocation scores 164, uncertainty measurements 168, and predicted impacts of the changes. In one or more embodiments, validation permission 172 may include a suggestion or recommendation for modification of weightings rather than an immediate execution command, thereby allowing an or operator to review and either approve, reject, or manually adjust the proposed reallocation before it is applied. In one or more embodiments, validation permission 172 may also function as a command structure, such that upon transmission to a user, system 100 may present an actionable instruction that the user may accept in whole. In one or more embodiments, validation permission 172 may include information describing the proposed reallocation, the adjusted weightings, and any associated allocation scores 164 or uncertainty measures. In one or more embodiments, validation permission 172 may further include an option to "accept" or "approve" the command. When the user selects acceptance, processor 108 may automatically execute the corresponding reallocation without further modification.

With continued reference to FIG. 1, system 100 may include a user interface 176 and/or a graphical user interface. For the purposes of this disclosure, a "user interface" is a means by which a user and a computer system interact; for example, through the use of input devices and software. A user interface 176 may include a graphical user interface (GUI), command line interface (CLI), menu-driven user interface, touch user interface, voice user interface (VUI), form-based user interface, any combination thereof, and the like. In one or more embodiments, user interface may be accessed using a computing device 104 distinct from and communicatively connected to processor 108, such as a smartphone, tablet, laptop, or other remote terminal operated by the user. In one or more embodiments, user interface 176 may include a graphical user interface. A "graphical user interface," as used herein, is a graphical form of user interface that allows users to interact with electronic devices. In some embodiments, the GUI may include icons, menus, other visual indicators or representations (graphics), audio indicators such as primary notation, and display information and related user controls. A menu may contain a list of choices and may allow users to select from among them. A menu bar may be displayed horizontally across the screen, such as a pull-down menu. When an option is clicked, the pull-down menu may appear. The menu may also include context menus that appear upon performing specific actions (e.g., right-clicking). Files, programs, web pages, and the like may be represented using icons within the GUI. These icons may offer a fast and intuitive way to open documents, initiate tasks, or access various system features.

In one or more embodiments, the system may include a graphical user interface (GUI) that is configured to display validation permissions 172. The GUI may be presented on a display device associated with a desktop computer, mobile device, or connected television management console. The GUI may include elements such as a dashboard panel displaying the plurality of video streams, their current weightings, and their corresponding allocation scores 164 and uncertainty measurements 168. The GUI may further include interactive elements such as buttons, toggles, sliders, or checkboxes that allow the user to accept, decline, or modify the suggested changes. In one or more embodiments, GUI may also include visualizations such as charts, bar graphs, or trend lines showing current and projected performance if the suggested reallocation is applied. Each validation permission 172 may be presented as a discrete message or notification within the GUI, populated by the processor 108 with contextual details including the identity of the video streams impacted, the magnitude of proposed weighting 132 adjustments, the anomaly 144 or anomalies prompting the change, and an indication of how the change aligns with campaign objectives. In one or more embodiments, processor 108 may transmit the validation permission 172 by writing an entry into the GUI's presentation layer, by issuing an alert such as a pop-up notification, or by updating a task queue visible to the user. Once displayed, the user may interact with the GUI to provide a response. In one or more embodiments, the response may include explicit approval of the suggested reallocation, modification of the suggested weighting 132 adjustments (e.g., increasing or decreasing a proposed change), or rejection of the proposal altogether. In one or more embodiments, processor 108 may then reallocate the fixed resource as a function of the response, either executing the proposed weighting 132 adjustments as suggested, applying modified values, or retaining existing allocations.

With continued reference to FIG. 1, in one or more embodiments, processor 108 may be configured to add adjustments associated with the plurality of video streams as entries to a searchable index. In one or more embodiments, the searchable index may be configured for retrieval in response to future queries. in one or more embodiments, processor 108 may be configured to add adjustments to a searchable index for retrieval in response to future queries. Each entry of the searchable index may include data identifying the video stream 124 or streams affected, the prior feature vector 160 inputs, the anomalies that prompted the adjustment, the allocation scores 164 and uncertainty measurements 168 generated by the adjustment machine learning model 156, the resulting weighting 132 changes, and the performance outcomes observed after reallocation. These entries may be stored with associated metadata 120 such as timestamps, platform identifiers, and campaign identifiers, enabling structured organization of historical adjustment records. The searchable index may be implemented as a database 116, inverted keyword index, or embedding-based vector index, and may support queries expressed as keywords, structured filters, or natural language. In some embodiments, the processor 108 may populate the index automatically after each reallocation, ensuring that every adjustment decision is recorded in a format optimized for retrieval. Once maintained, the searchable index may provide a mechanism by which a user can access historical adjustment information at a later date. For example, the searchable index may be queried to determine which reallocations improved engagement, how often weightings were adjusted for a particular video stream 124, or what anomalies most frequently triggered changes. Results from the index may be displayed through a graphical user interface, exported to reporting tools, or incorporated into performance summaries. In one or more embodiments, searchable index may be located on database 116 116. In one or more embodiments, searchable index may be used in conjunction with a chatbot or large language model (LLM) to generate informed responses to user queries. For example, a user may submit a natural language query such as "Why was Stream A's budget reduced last week?" or "Which reallocations improved completion rate the most?" The chatbot or LLM may retrieve relevant entries from the searchable index and condition its response on the retrieved records, thereby producing contextually accurate, human-readable explanations. In this way, the searchable index serves as a knowledge base that supports transparency, auditability, and explainability of the reallocation process, while also enabling enhanced user interaction through conversational interfaces. In one or more embodiments, searchable index may be used in conjunction with any chatbot as described in this disclosure. In one or more embodiments, searchable index may be consistent with and/or stored on database 116.

With continued reference to FIG. 1, system may include a chatbot system. A "chatbot system" for the purposes of this disclosure is a program configured to simulate human interaction with a user in order to receive or convey information. In one or more embodiments, chatbot system may be configured to receive communications from a user and/or elements thereof and any other data as described in this disclosure through interactive questions, presented to the user. In one or more embodiments, chatbot system may be configured to simulate human interaction wherein chatbot system may present questions in a natural language format, wherein the questions are associated with additional information required by an LLM. In one or more embodiments, inputs by the user may also be received in a natural language format wherein chatbot system may be configured to convert the inputs into computer languages that can be better understood by an LLM. In one or more embodiments, chatbot system may be configured to simulate human interaction in a variety of languages based on the preferences of a user. In one or more embodiments, the chatbot system may receive natural-language inputs (spoken or typed) and transform them into machine-executable forms suitable for downstream components, including a large language model (LLM). In one or more embodiments, chatbot system may leverage retrieval-augmented generation to ground responses and actions in system records. In one or more embodiments, chatbot may retrieve relevant entries from searchable index (e.g., prior weighting adjustments, allocation scores, uncertainty measurements, performance outcomes, timestamps, platforms, audiences) and condition an LLM's response on those records to produce fact-backed explanations or to populate command parameters accurately.

Figure 2:
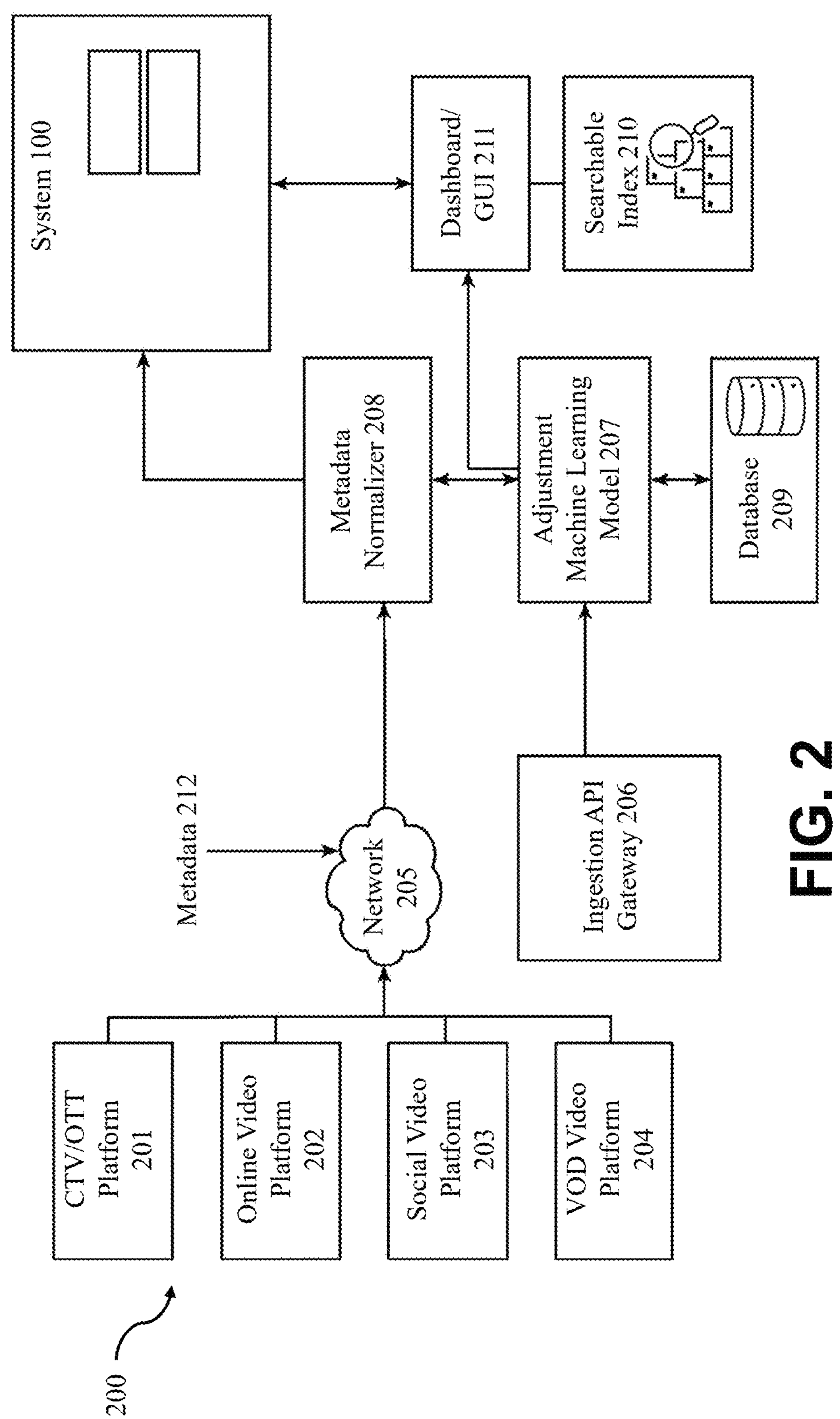
FIG. 2 is an exemplary block diagram for system architecture.

Referring now to FIG. 2, an exemplary block diagram for system architecture 200 is described. In one or more embodiments, system architecture 200 may depict an exemplary architecture in which System 100 communicates with multiple streaming platforms via a network 205 to ingest metadata 212 associated with a plurality of video streams. In one or more embodiments, metadata 212 may be received from streaming platforms such as but not limited to including a CTV/OTT Platform 201, an Online Video Platform 202, a Social Video Platform 203, a VOD Platform 204 and/or the like. Each platform may generate and/or publish metadata for its video streams. In one or more embodiments, metadata may include fields such as stream_id, platform_id, creative_id, weighting, key performance indicators (KPIs), timestamps and/or the like. The inbound traffic may be received at an Ingestion API Gateway 206 which may support programmatic interfaces (e.g., REST callbacks, webhook posts, signed feeds) and queueing semantics for burst tolerance and ordering. From ingestion API gateway 206, the metadata 212 may flow to a Metadata Normalizer 208, which converts heterogeneous, platform-specific schemas into a canonical record format, performs validation and deduplication, attaches campaign and stream identifiers, aligns timestamps, and/or associates each record with a current weighting for the corresponding video stream. Meta Normalizer 208 may supply records both to System 100 for control and monitoring and to an Adjustment machine learning (ML) Model 207 for scoring. Adjustment ML Model 207 may derive or consume feature vectors from the normalized records and generate allocation scores and uncertainty measurements per stream. In one or more embodiments, Adjustment ML model 207 may read/write historical examples and outcomes to database 209 to support training and audit logging. The model's outputs and contextual details may be surfaced to a Dashboard/GUI 211, which renders, among other elements, a validation permission proposal for user approval as described elsewhere. User interactions at Dashboard/GUI 211 (e.g., accept/modify/reject) can trigger updates by System 100 to the live allocations and write structured events to database 209 or a searchable Index 210, enabling later retrieval and explanation.

Figure 3:
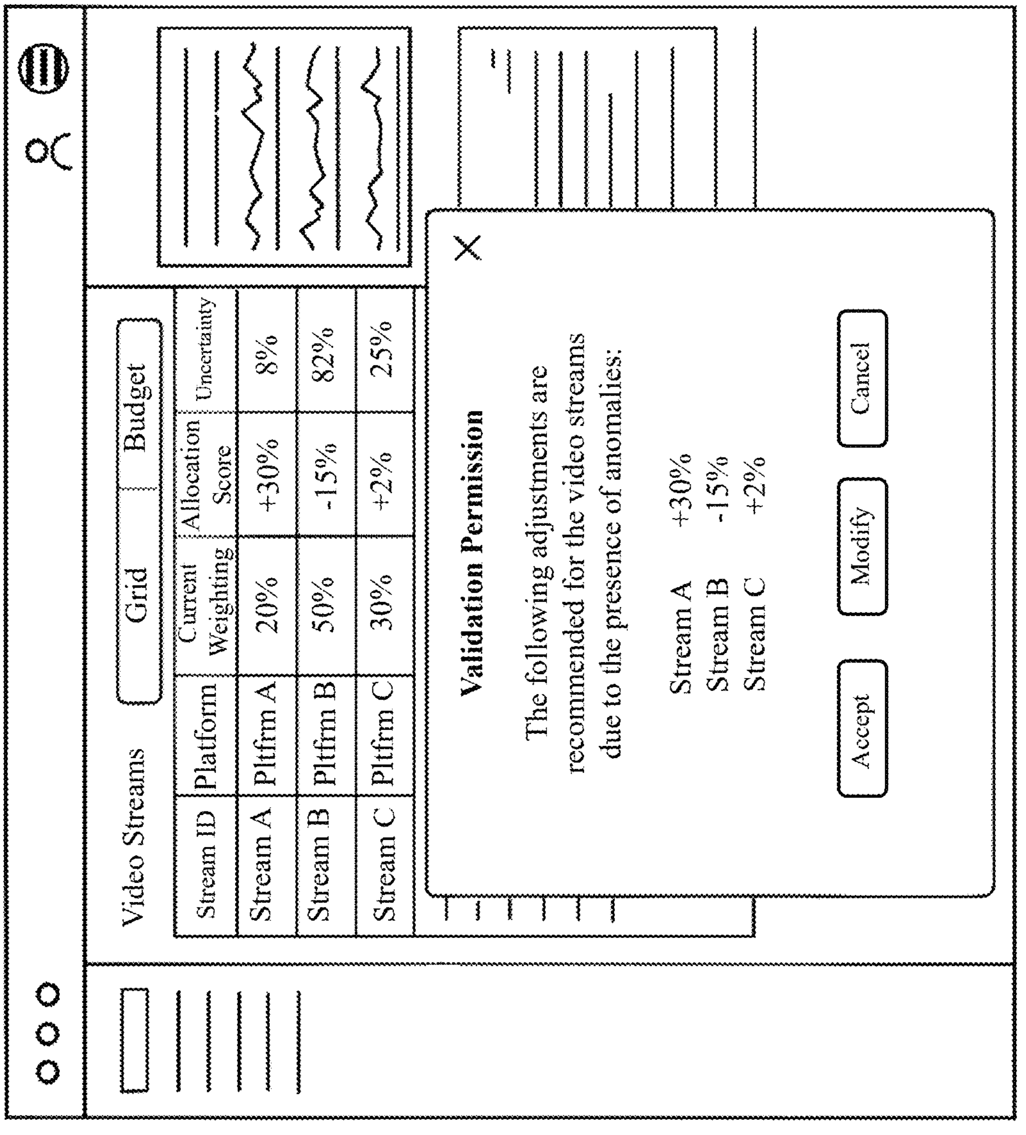
FIG. 3 illustrates an exemplary embodiment of a graphical user interface.

Referring now to FIG. 3, an exemplary embodiment of a graphical user interface (GUI 300) is described. In one or more embodiments, GUI 300 may be rendered by system as described in FIGS. 1-2. In one or more embodiments, GUI 300 is shown within a window having a header that may display a campaign name or selector and standard window controls. A navigation region may present links or filters for platforms, audiences, or date ranges. A panel may list a plurality of video streams in tabular form, each row corresponding to a stream and each column presenting attributes such as stream identifier, platform, current weighting, allocation score, uncertainty measurement and the like. In one or more embodiments, tables and charts within GUI 300 may populated by a processor using metadata and performance data received from one or more streaming platforms. In one or more embodiments, allocation score and uncertainty measurement shown in columns may include outputs produced by the adjustment machine-learning model based on the active feature vectors. In one or more embodiments, an overlaid validation permission modal may be presented when processor determines that one or more suggested weighting adjustments should be reviewed. In the illustrated embodiment, the modal shows itemized proposals (e.g., "Stream A−10%," "Stream B+10%"), and may present predicted impact indicators (e.g., expected change in completion rate or CPA) derived from the model. Upon user interaction, processor act in response to the selection. If 'Accept' is selected, processor may update the weightings for the indicated streams, push those updates to the appropriate buying/delivery platforms via APIs, writes structured change-log entries and/or input changes to a searchable index.

Figure 4:
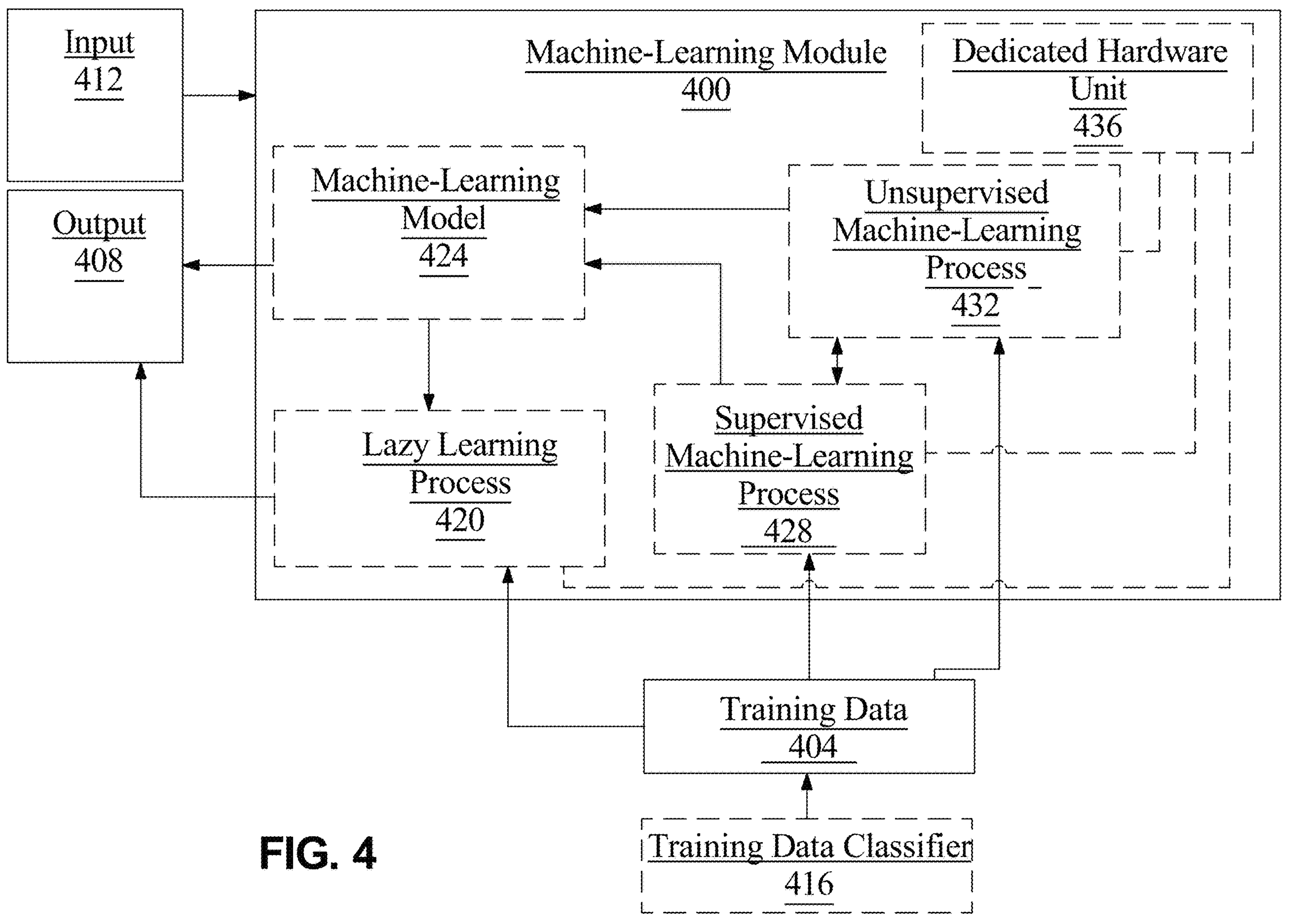
FIG. 4 is a block diagram of exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include inputs such as performance and/or performance data whereas outputs may include outputs such as adjusted weightings, allocations scores uncertainty measurements and/or the like.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to categories of performance, such as for example, user interaction, user engagement, click through rates and/or the like.

Still referring to FIG. 4, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $\alpha_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators to take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean upside-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as performance datum, anomalies and/or the like as described above as inputs, adjusted weightings, allocated scores and/or uncertainty measurements as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Continuing to refer to FIG. 4, evaluation of error function and/or other comparison results may include comparison of each of error function and/or other comparison results to a maximum single error threshold; in other words, a criterion of evaluation may include performing iterative retraining if any single comparison and/or error function output exceeds maximum single error threshold or if a count of single comparison and/or error function outputs exceeding single error threshold exceeds a threshold number and/or proportion of overall error function and/or other comparison results. Alternatively or additionally, evaluation of error function and/or other comparison results may include comparison of an aggregated plurality of error function and/or other comparison results to an aggregate error threshold; in other words, a criterion of evaluation may include performing iterative retraining if a result of averaging or otherwise aggregating a plurality such as some or all evaluated function and/or other comparison results exceeds aggregate error threshold. Aggregation may be performed in any manner of aggregation described in this disclosure and/or any combination thereof. Criteria for evaluations may be evaluated separately such that failing any one criterion causes iterative retraining; alternatively or additionally evaluation results may be combined according to one or more logical or other rules.

As a non-limiting, illustrative example, and still referring to FIG. 4, where outputs to be compared by error function are numerical values, error function may include subtraction of one from the other to derive an absolute value and/or mean squared error. Where outputs and/or training examples are represented as a binary classification, an error function may include a hinge loss function, sigmoid cross entropy loss function, weighted cross entropy loss function, or the like. Where output and/or exemplary output in a training set is a classification to three or more values, error function may include a softmax cross entropy loss function, a sparse cross entropy loss function, a Kullback-Leibler divergence loss function, or the like. Where both retaining and training with include supervised training, retraining may use a different error function, different weight update functions and/or parameters, or the like than in the training stage. For instance, and without limitation, when a previous iterative retraining process included training using examples from until a first convergence threshold and/or epsilon value and/or neighborhood is met, a subsequent iterative retraining process may include a lower convergence threshold, a smaller value of epsilon, or the like. Iterative retraining may include using one or more examples that were not used in any previous training and/or retraining process; for instance, where convergence was initially and/or previously achieved using a first subset of examples a subsequent retraining process may use examples from a second subset of examples, which may be wholly disjoint from first subset and/or have one or more elements that are not found in first subset.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
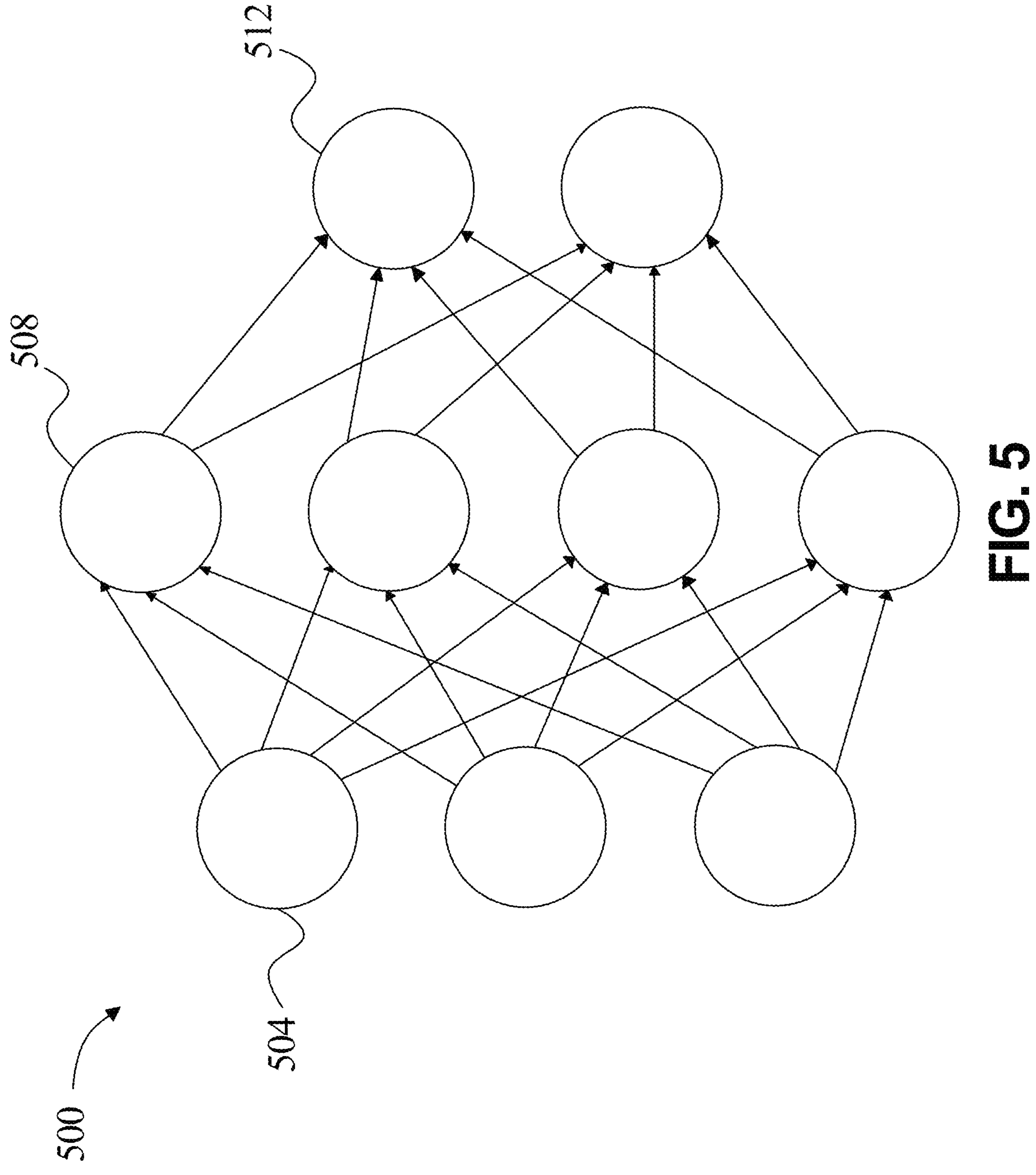
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
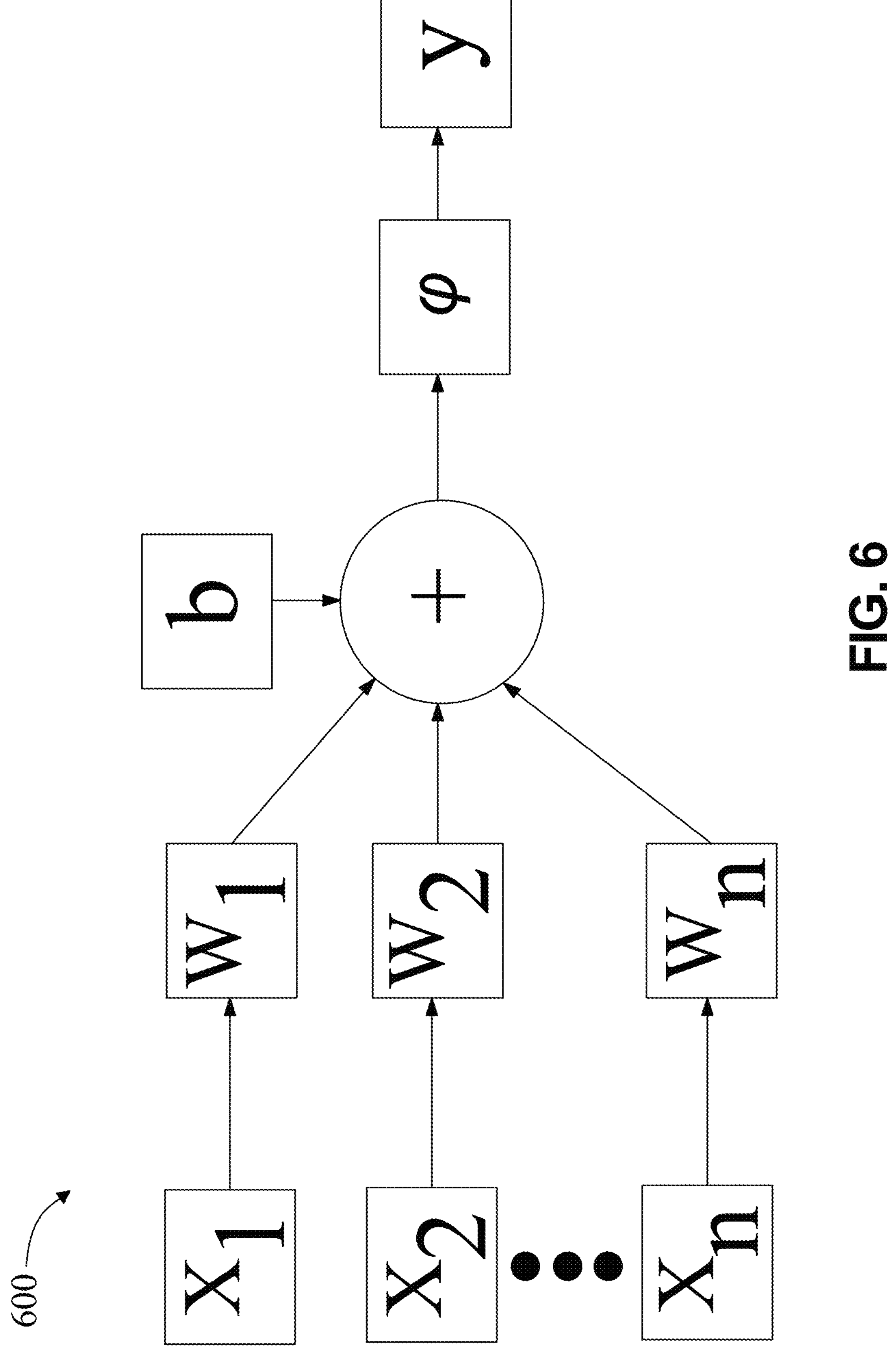
FIG. 6 is a block diagram of an exemplary embodiment of a node of a neural network.

Referring now to FIG. 6, an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tan h derivative function such as $f(x)=\tan h^2(x)$, a rectified linear unit function such as $f(x)=\max(0, x)$, a "leaky" and/or "parametric" rectified linear unit function such as $f(x)=\max(\alpha x, x)$ for some $\alpha$, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=\alpha(1+\tan h(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha\frac{dJ}{dw}$$

where $w_{new}$ is the updated weight value, $w_{old}$ is the previous weight value, $\alpha$ is a parameter to set the learning rate, and $$\frac{dJ}{dw}$$

is the partial derivative of with respect to weight w.

Figure 7:
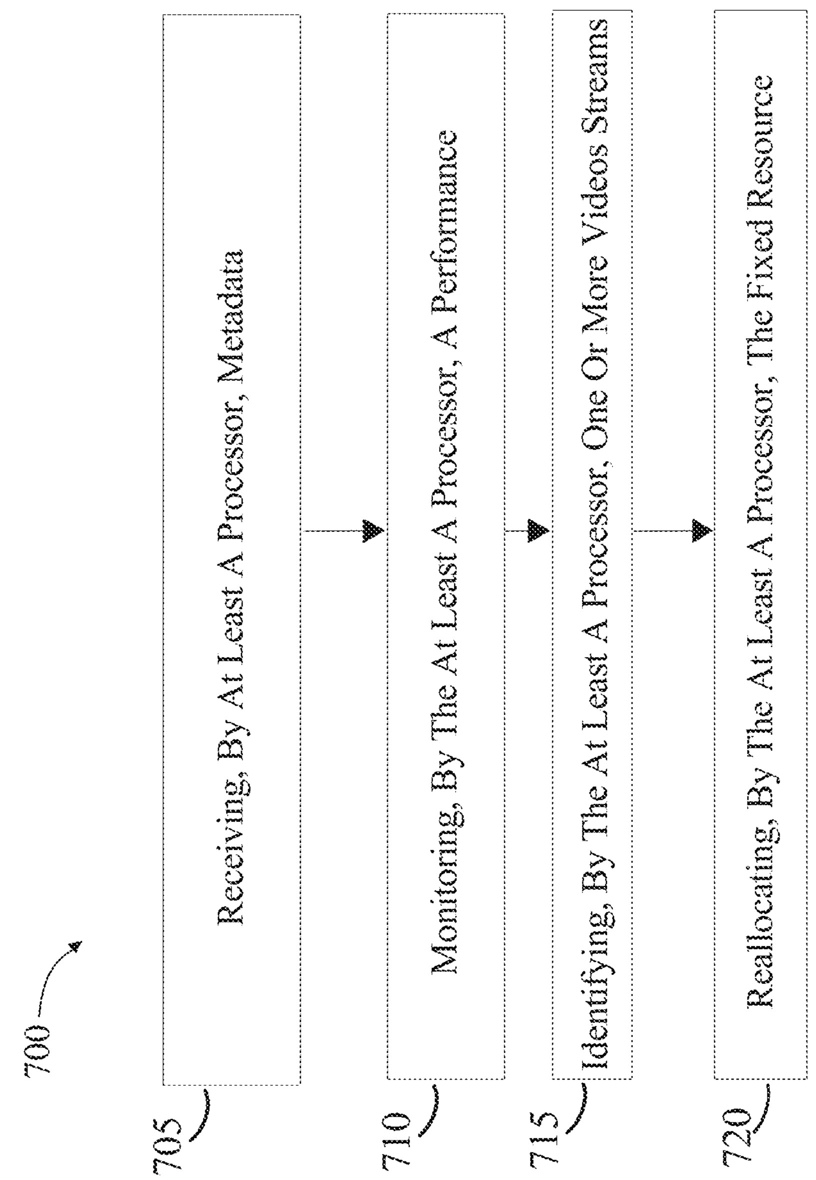
FIG. 7 is a flow diagram illustrating an exemplary embodiment of a method for dynamic recalibration of video streams.

Referring now to FIG. 7, a method 700 for dynamic recalibration of video streams is described. at step 705, method 700 includes receiving, by at least a processor, metadata associated with a plurality of video streams situated on one or more streaming platforms, wherein each video stream of the plurality of video streams includes a weighting associated with an allocation of a fixed resource. This may be implemented with reference to FIGS. 1-6.

With continued reference to FIG. 7, at step 710 method 700 includes monitoring, by the at least a processor, a performance of the plurality of video streams by identifying at least an interaction metric as a function of the metadata. This may be implemented with reference to FIGS. 1-6.

With continued reference to FIG. 7, at step 715 method 700 includes identifying, by the at least a processor, one or more videos streams including an anomaly by comparing the performance of each of the plurality of video streams to one or more streaming thresholds. This may be implemented with reference to FIGS. 1-6.

With continued reference to FIG. 7, at step 720 method 700 includes reallocating, by the at least a processor, the fixed resource by adjusting the weighting of one or more video streams of the plurality of video streams as a function of the anomaly. In one or more embodiments, the metadata includes records and associated timestamps within a defined temporal interval. In one or more embodiments, monitoring the performance of the plurality of video streams includes projecting a future interaction metric for each video stream of the plurality of video streams as a function of the records and the associated timestamps. In one or more embodiments, identifying one or more video streams including the anomaly includes generating a plurality of adjusted thresholds by adjusting the one or more streaming thresholds as a function of the weighting and comparing the performance of the plurality of video streams to the plurality of adjusted thresholds. In one or more embodiments, reallocating the fixed resource includes adjusting the weighting of each video stream of the plurality of video streams in real time.

In one or more embodiments, adjusting a weighting associated with the one or more video streams includes inputting a feature vector representative of each video stream of the plurality of video streams into an adjustment machine learning model, generating, using the adjustment machine learning model, an allocation score and an uncertainty measurement for each feature vector and adjusting the weighting of each video stream based on the allocation score and the uncertainty measurement. In one or more embodiments, the adjustment machine learning model includes training data of a plurality historical feature vectors correlated to a plurality of historical allocation scores and uncertainty measurements. In one or more embodiments, the adjustment machine learning model is trained by identifying at least one video stream associated with a prior weighting adjustment that was generated by the adjustment machine learning model, comparing a current performance of the at least one video stream to a previous performance associated with the prior weighting adjustment and updating parameters of the adjustment machine learning model in an automated feedback loop based on a delta between the current performance and the previous performance. In one or more embodiments, reallocating the fixed resource includes transmitting a validation permission through a graphical user interface and reallocating the fixed resource as a function of a response associated with the validation permission. In one or more embodiments, method 700 further includes adding, using the at least a processor, adjustments associated with the plurality of video streams as entries to a searchable index, the searchable index configured for retrieval in response to future queries. This may be implemented with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
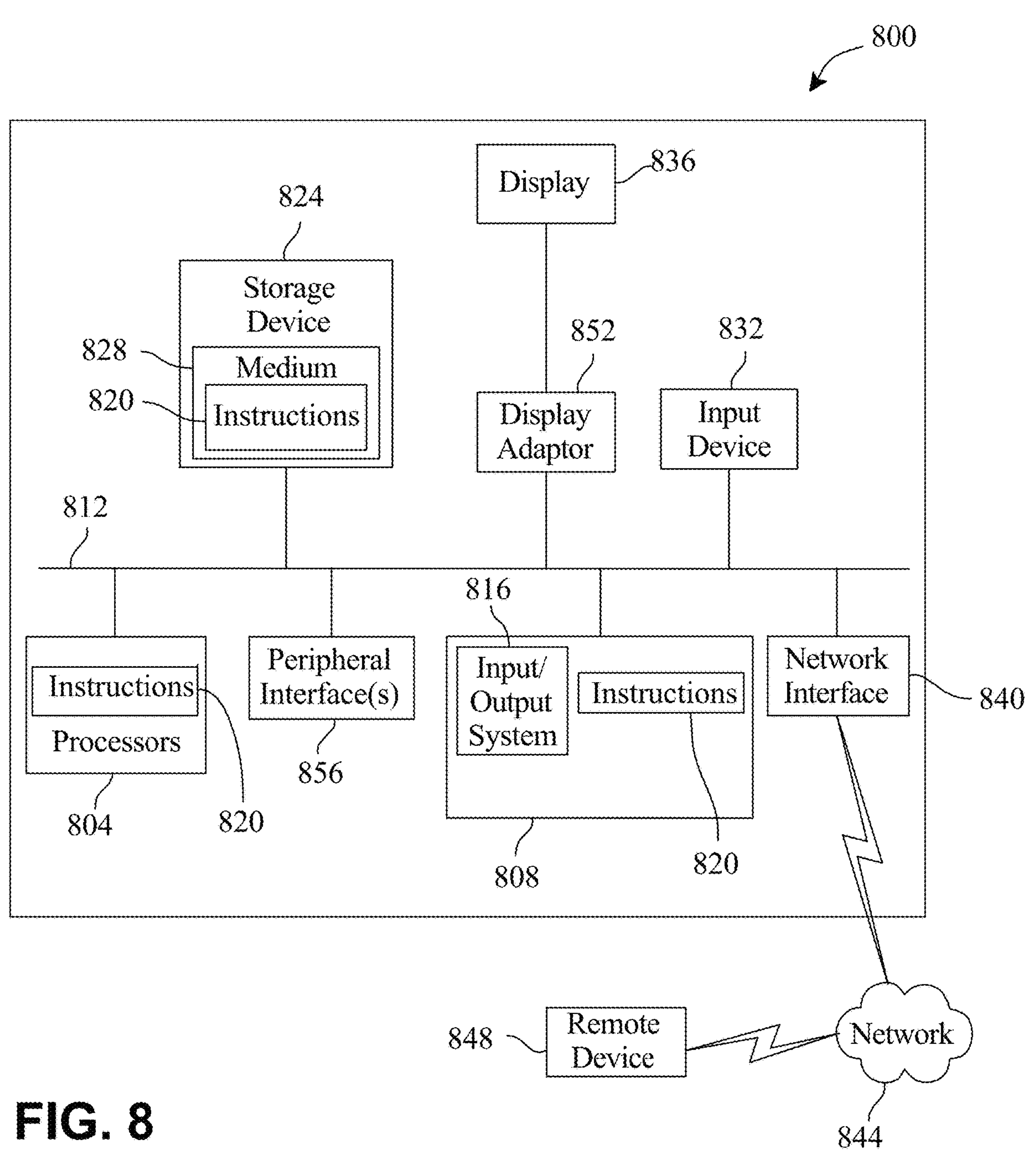
FIG. 8 is a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof. Memory 808 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In some embodiments, storage device 824 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

Further referring to FIG. 8, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 8, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 8, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In one or more embodiments, one or more of computing system 800, processor 804, and memory 808 may be virtualized; that is, a virtual machine and/or container may interact directly with such computing system 800, processor 804, and/or memory 808, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 804 comprises a plurality of processors and/or processor cores, virtualization may, in one or more embodiments, simulate or emulate a single (virtual) processor whose functions are allocated to one or more of the plurality of processors and/or processor cores. In this case, while processor 804 may be said to be virtualized, the processor 804, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas; and (4) kernel-based virtual machine (KVM) www.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for dynamic recalibration of video streams, the system comprising:

a processor; and a memory communicatively connected to the processor, the memory containing instructions configuring the processor to:

receive metadata associated with a plurality of video streams situated on one or more streaming platforms, wherein each video stream of the plurality of video streams comprises a weighting associated with an allocation of a fixed resource;

monitor a performance of the plurality of video streams by identifying at least an interaction metric as a function of the metadata;

identify one or more video streams comprising an anomaly by comparing the performance of each of the plurality of video streams to one or more streaming thresholds;

generate a delta value representing a magnitude and direction of deviation between the interaction metric and a corresponding streaming threshold; and reallocate the fixed resource by adjusting the weighting of one or more video streams of the plurality of video streams as a function of the anomaly and the delta value, wherein the adjustment is normalized across the plurality of video streams, wherein adjusting the weighting of the one or more video streams comprises an adjustment machine learning model wherein the adjustment machine learning model is trained by:

identifying at least one video stream associated with a prior weighting adjustment that was generated by the adjustment machine learning model; comparing a current performance of the at least one video stream to a previous performance associated with the prior weighting adjustment; and updating parameters of the adjustment machine learning model in an automated feedback loop based on a delta, representing a magnitude and direction of deviation between a corresponding interaction metric as a function of metadata and a corresponding streaming threshold, between the current performance and the previous performance.

2. The system of claim 1, wherein the metadata comprises records and associated timestamps within a defined temporal interval.

3. The system of claim 2, wherein monitoring the performance of the plurality of video streams comprises projecting a future interaction metric for each video stream of the plurality of video streams as a function of the records and the associated timestamps.

4. The system of claim 1, wherein identifying one or more video streams comprising the anomaly comprises:

generating a plurality of adjusted thresholds by adjusting the one or more streaming thresholds as a function of the weighting; and comparing the performance of the plurality of video streams to the plurality of adjusted thresholds.

5. The system of claim 1, wherein reallocating the fixed resource comprises adjusting the weighting of each video stream of the plurality of video streams in real time.

6. The system of claim 1, wherein adjusting a weighting associated with the one or more video streams comprises:

inputting a feature vector representative of each video stream of the plurality of video streams into the adjustment machine learning model;

generating, using the adjustment machine learning model, an allocation score and an uncertainty measurement for each feature vector; and adjusting the weighting of each video stream based on the allocation score and the uncertainty measurement.

7. The system of claim 6, wherein the adjustment machine learning model comprises training data of a plurality historical feature vectors correlated to a plurality of historical allocation scores and uncertainty measurements.

8. The system of claim 1, wherein reallocating the fixed resource comprises:

transmitting a validation permission through a graphical user interface; and reallocating the fixed resource as a function of a response associated with the validation permission.

9. The system of claim 1, wherein the processor is further configured to add adjustments associated with the plurality of video streams as entries to a searchable index, the searchable index configured for retrieval in response to future queries.

10. A method for dynamic recalibration of video streams, the method comprising:

receiving, by at least a processor, metadata associated with a plurality of video streams situated on one or more streaming platforms, wherein each video stream of the plurality of video streams comprises a weighting associated with an allocation of a fixed resource;

monitoring, by the at least a processor, a performance of the plurality of video streams by identifying at least an interaction metric as a function of the metadata;

identifying, by the at least a processor, one or more videos streams comprising an anomaly by comparing the performance of each of the plurality of video streams to one or more streaming thresholds;

generating a delta value representing a magnitude and direction of deviation between the interaction metric and a corresponding streaming threshold; and reallocating, by the at least a processor, the fixed resource by adjusting the weighting of one or more video streams of the plurality of video streams as a function of the anomaly and the delta value, wherein the adjustment is normalized across the plurality of video streams, wherein adjusting the weighting of the one or more video streams comprises an adjustment machine learning model wherein the adjustment machine learning model is trained by:

identifying at least one video stream associated with a prior weighting adjustment that was generated by the adjustment machine learning model;

comparing a current performance of the at least one video stream to a previous performance associated with the prior weighting adjustment; and updating parameters of the adjustment machine learning model in an automated feedback loop based on a delta, representing a magnitude and direction of deviation between a corresponding interaction metric as a function of metadata and a corresponding streaming threshold, between the current performance and the previous performance.

11. The method of claim 10, wherein the metadata comprises records and associated timestamps within a defined temporal interval.

12. The method of claim 11, wherein monitoring the performance of the plurality of video streams comprises projecting a future interaction metric for each video stream of the plurality of video streams as a function of the records and the associated timestamps.

13. The method of claim 10, wherein identifying one or more video streams comprising the anomaly comprises:

generating a plurality of adjusted thresholds by adjusting the one or more streaming thresholds as a function of the weighting; and comparing the performance of the plurality of video streams to the plurality of adjusted thresholds.

14. The method of claim 10, wherein reallocating the fixed resource comprises adjusting the weighting of each video stream of the plurality of video streams in real time.

15. The method of claim 10, wherein adjusting a weighting associated with the one or more video streams comprises:

inputting a feature vector representative of each video stream of the plurality of video streams into the adjustment machine learning model;

generating, using the adjustment machine learning model, an allocation score and an uncertainty measurement for each feature vector; and adjusting the weighting of each video stream based on the allocation score and the uncertainty measurement.

16. The method of claim 15, wherein the adjustment machine learning model comprises training data of a plurality historical feature vectors correlated to a plurality of historical allocation scores and uncertainty measurements.

17. The method of claim 10, wherein reallocating the fixed resource comprises:

transmitting a validation permission through a graphical user interface; and reallocating the fixed resource as a function of a response associated with the validation permission.

18. The method of claim 10, the method further comprising adding, using the at least a processor, adjustments associated with the plurality of video streams as entries to a searchable index, the searchable index configured for retrieval in response to future queries.

* * * * *